(12) United States Patent
Rieger et al.

(10) Patent No.: US 8,303,045 B2
(45) Date of Patent: Nov. 6, 2012

(54) PROTECTIVE DEVICE FOR TIRE WALLS OF VEHICLE TIRES

(75) Inventors: Hansjörg Rieger, Aalen (DE); Johannes Werner Rieger, Oberkochen (DE); Zvonimir Bogdan, Abtsgmünd (DE)

(73) Assignee: Erlau AG, Aalen (DE)

( * ) Notice: Subject to any disclaimer, the term of this patent is extended or adjusted under 35 U.S.C. 154(b) by 355 days.

(21) Appl. No.: 12/553,998

(22) Filed: Sep. 4, 2009

(65) Prior Publication Data

US 2010/0060072 A1  Mar. 11, 2010

(30) Foreign Application Priority Data

Sep. 5, 2008  (DE) .................. 10 2008 046 568

(51) Int. Cl.
  *B60B 7/01*  (2006.01)
  *B60B 15/02*  (2006.01)
(52) U.S. Cl. ................ 301/37.23; 301/47; 301/44.1
(58) Field of Classification Search .... 301/37.22–37.24, 301/38.1, 39.1, 40.1–40.2, 40.4, 40.6, 41.1, 301/43, 44.1, 44.3–44.4, 45–51; 152/216
See application file for complete search history.

(56) References Cited

U.S. PATENT DOCUMENTS

| | | | | |
|---|---|---|---|---|
| 1,200,061 | A * | 10/1916 | Wentworth | 301/37.22 |
| 1,410,200 | A * | 3/1922 | Lunz | 301/47 |
| 1,411,544 | A * | 4/1922 | Whiting | 301/11.1 |
| 1,430,291 | A * | 9/1922 | Denson | 301/51 |
| 2,488,864 | A | 11/1949 | Handy | |
| 3,065,995 | A * | 11/1962 | Beacher | 301/39.1 |
| 3,078,126 | A * | 2/1963 | Yates | 301/44.1 |
| 4,235,271 | A * | 11/1980 | Olsen et al. | 301/37.22 |
| 4,533,183 | A * | 8/1985 | Gant | 301/37.23 |
| 5,531,508 | A | 7/1996 | Bell | |
| 6,257,675 | B1 | 7/2001 | Leynaert | |
| 8,042,878 | B2 * | 10/2011 | Auxerre | 301/37.23 |

FOREIGN PATENT DOCUMENTS

| AU | 580 434 | B2 | 1/1989 |
|---|---|---|---|
| WO | 2008/092185 | | 8/2008 |

* cited by examiner

*Primary Examiner* — Jason Bellinger
(74) *Attorney, Agent, or Firm* — Gudrun E. Huckett

(57) ABSTRACT

A protective device for tire walls has a holder for attaching the protective device on a wheel. The protective device has protective elements connected to the holder. The protective elements are shape-stable parts that under load are elastically deformable. They extend approximately radially away from the holder. The protective elements do not protect the entire tire but only the endangered area of the tire walls.

42 Claims, 23 Drawing Sheets

PROTECTIVE DEVICE FOR TIRE WALLS OF VEHICLE TIRES

BACKGROUND OF THE INVENTION

The invention concerns a protective device for tire walls of vehicle tires that comprises at least one holder for attachment of the protective device on the wheel and further comprises protective elements.

Depending on the ground across which the vehicles travel the tire walls are exposed to significant wear. The ground can comprise rocks, stones, scrap metal, slag or the like that cause significant load on the tire walls. Such unfavorable conditions occur for example on dumps where haul trucks, for example, dump trucks, travel. In such applications the tire walls are damaged within a short period of time and have cuts of such a kind that the tires must be changed. For protection of the tires protective tire chains are known that, however, are too complex for such applications. Moreover, such protective tire chains have a very great weight, are expensive, and are difficult to mount and demount. Also, protective tire chains are not suitable for vehicles that travel at higher speeds, for example, 50 km/h, or travel longer distances. In these situations, the protective tire chains wear relatively quickly. Protective tire chains also lead to higher fuel consumption because the tires, when rolling across the chain links, deform greatly (flexing work) and this requires a higher drive power. Also, the great weight of the protective tire chain contributes to higher fuel consumption.

The invention has the object to configure a protective device of the aforementioned kind in such a way that, while being producible in a simple and inexpensive way and mountable in a simple way, it ensures optimal protection of the tire walls, wears only minimally, and leads to a reduced fuel consumption of the vehicle.

SUMMARY OF THE INVENTION

This object is solved according to the invention for the protective device of the aforementioned kind in that the protective elements are shape-stable parts that are elastically deformable under load and that extend away from the holder approximately in radial direction.

In the protective device according to the invention the protective elements are formed by form-stable parts that under load are elastically deformable. They extend away from the holder approximately radially when viewed in the axial direction of the tire. In contrast to the protective tire chains, the protective elements do not protect the entire tire but only the endangered area of the tire wall. The protective device has thus only minimal weight, can be mounted in a simple way, and, in particular, can be manufactured inexpensively. Since the protective elements are shape-stable they assume in an initial position in which they are not under load a predetermined position relative to the tire wall to be protected. When the vehicle with the tires travels across objects on the ground, the protective elements can yield by elastic deformation so that they will not be damaged by these objects. Still, by means of the protective elements it is ensured that the tire walls are protected. Should objects penetrate between protective device and tire wall, the objects are moved outwardly because of the elastic deformation of the protective elements within a short travel distance so that these objects will neither damage the tire wall nor the protective elements nor the entire protective device. The protective device according to the invention is very well suited for vehicles that travel at higher speeds, for example, 50 km/h, or travel greater distances. The protective device wears only minimally. Since it is not traveled across by the tire, the fuel consumption of the vehicle on whose tires the protective device is mounted can be kept minimal. In particular, the minimal weight of the protective device contributes to this.

Advantageously, the protective elements extend across the entire radial width of the tire wall so that it is protected completely.

Advantageously, the protective elements are spaced at a distance from the tire wall. This has the advantage that the protective elements will not rub continuously against the tire wall and therefore will not cause premature wear of the tire wall.

A simple attachment of the protective elements results when they are attached with one end on a ring of the holder with which the protective device is mounted on the tire.

In order for this ring to occupy only minimal space, it is embodied as a flat annular disk.

In this connection, it is advantageous when this annular disk is positioned in a plane that is approximately parallel to the tire wall. In this way, the annular disk only projects minimally past the tire so that the risk of damage of the annular disk as well as of the protective elements attached thereto is minimal.

Advantageously, the ring, viewed transversely to the tire axle, is positioned within the area adjacent to the tire wall. In this connection, the ring may be positioned on the exterior side adjacent to the tire wall. It is however also possible, in particular when the vehicle wheel or the wheel rim has a greater diameter, that the ring, transversely to the axle of the tire, is positioned within the tire opening or the wheel rim opening.

Since the tire projects past the wheel rim, it is also possible that the ring, viewed transversely to the axle of the tire, is positioned in the plane of the tire wall. In this case, the ring does not project outwardly past the tire wall.

In order for the protective device to be matched easily to different width of tires, the ring can be advantageously adjusted in the axial direction of the tire.

In order to ensure simple mounting of the protective device, the ring is advantageously provided with insertion parts that project transversely away from it and that are inserted into receptacles.

These receptacles are preferably sleeves that are secured advantageously on a coupling member of the holder. With such a configuration, the protective device can be mounted and demounted in a simple way because first the coupling member is mounted and only subsequently the ring with the protective elements is inserted by means of the insertion parts into the receptacles of the coupling member. In order to occupy little space, the receptacles extend advantageously parallel to the axle of the tire.

Simple mounting of the protective device results when the coupling member is formed as a ring.

So that the protective device can be mounted on differently sized tires, the diameter of this ring can be advantageously adjustable. In this way, the protective device according to the invention can be used on tires or wheel rims of different diameters.

The ring is comprised advantageously of at least two ring sections of part-circular shape that are detachably connected to one another. In this connection, the rings are advantageously connected to one another by means of a screw.

By means of the screw, the spacing between the ring sections and thus the diameter of the coupling member can be adjusted in a very simple way.

The coupling member can be embodied as a one-piece clamping ring. By means of it, the coupling member can be advantageously attached on the wheel rim of the vehicle wheel. The ends of the one-piece clamping ring are advantageously connected to one another by means of a clamping element with which the clamping ring can be clamped against the inner side of the wheel rim.

The protective elements are advantageously at least partially coil springs. They are components that may be produced in a simple and inexpensive way and that moreover enable simple attachment on the holder.

This simple attachment is facilitated when the coil springs are connected by at least one axle to the ring of the holder.

The axle engages one end of the coil spring that can be attached in a simple way on the axle.

The axle projects advantageously outwardly in the radial direction past the ring so that it imparts a satisfactory shape stability to the coil spring.

The coil spring itself projects advantageously past the axle with the major portion of its length. In this way it is ensured that the coil spring in a load situation can flexibly yield in all directions.

The coil spring may have across its length a constant but also a varying diameter. In this way, by means of the shape of the spring the protective device can be matched to the respective application.

The coil spring can be embodied in a cone shape. In this connection, the coil spring can be arranged such that its diameter increases outwardly or inwardly in the radial direction.

In order for the tire wall to be optimally protected across the entire circumference, the protective elements are advantageously uniformly distributed about the circumference of the holder.

When the spacing between neighboring protective elements is appropriately large, between neighboring protective elements at least one intermediate element is arranged that protects the area of the tire wall between the protective elements.

The intermediate element can be formed by a chain net that has high strength and also high wear resistance.

Since during use of the vehicles the outer area in the radial direction of the tire walls is generally loaded more strongly than the inner area of the radial direction, the chain net can advantageously have a wider mesh inwardly than outwardly in the radial direction.

However, it is also possible of course that the chain net has uniformly sized mesh openings so that across the entire radial width the tire wall is optimally protected.

The chain net can be attached with radial inwardly positioned chain lengths on the radial inner end of the protective elements. When the points of attack of the chain lengths are located on diametrically opposed locations of the protective elements, they are secured in a plane that is approximately parallel to the plane containing the tire wall.

When the chain lengths engage radially farther inwardly or radially farther outwardly, a force is acting on the protective elements in the direction toward the tire wall or in the opposite direction. This has the result that the protective elements will extend from their holder in the direction toward the tire wall or away from the tire wall.

The intermediate element between neighboring protective elements can also be formed by fabric.

When the fabric is advantageously provided with mesh openings, objects that penetrate between the protective device and the tire wall can drop out quickly through the mesh openings.

Intermediate elements are not required when the spacing between neighboring protective elements is smaller than their cross-sectional width. In this case, neighboring protective elements are positioned at such a minimal spacing relative to one another that objects on the ground cannot penetrate between the protective elements so as to reach the tire wall.

BRIEF DESCRIPTION OF THE DRAWINGS

Further features of the invention result from the claims, the description, and the drawings.

The invention will be explained in more detail with the aid of some embodiments illustrated in the drawings.

DESCRIPTION OF PREFERRED EMBODIMENTS

The protective device serves for protecting tire walls from damage and/or cuts caused by objects such as rocks, stones, scrap metal, slag, and the like. In this connection, the protective device is designed such that it does not have constant contact with the tire wall. In this way, the tire wall as well as the protective device are protected from premature wear. As will be explained in detail in the following with the aid of different embodiments, the protective device can be mounted or demounted, as needed, on the tire. In this way, the protective device must be mounted on the tire only when there is danger for the tire walls. The protective device is moreover advantageously designed such that it has no contact with the roadway or the ground so that the roadway cannot become damaged by the protective device. The components of the protective device are designed and arranged such that only in a critical situation they fulfill their function but otherwise do not exert any pressure onto the tire or the tire wall.

Figure 1:
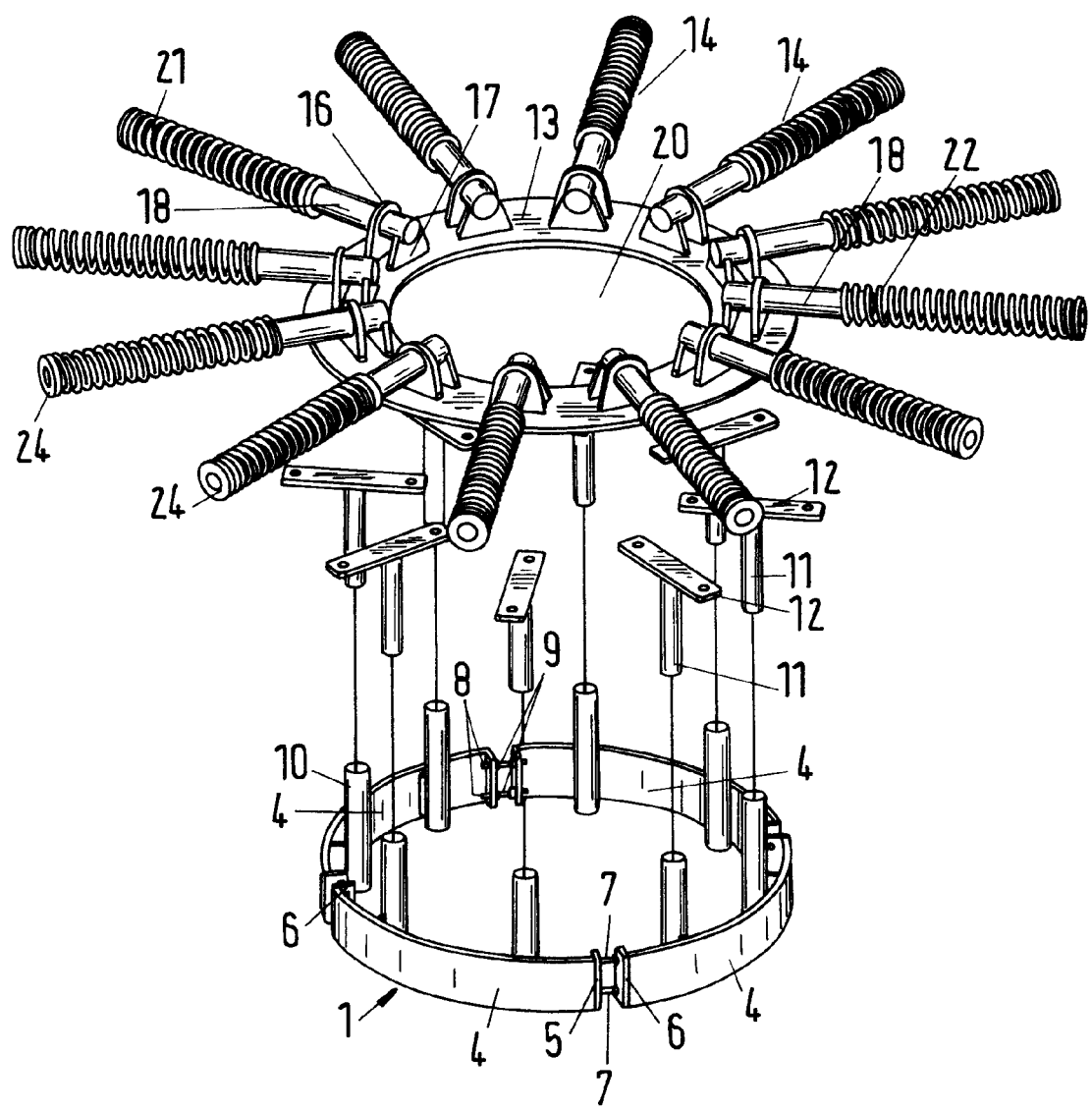
FIG. 1 shows in an exploded view a first embodiment of a protective device according to the invention.
Figure 2:
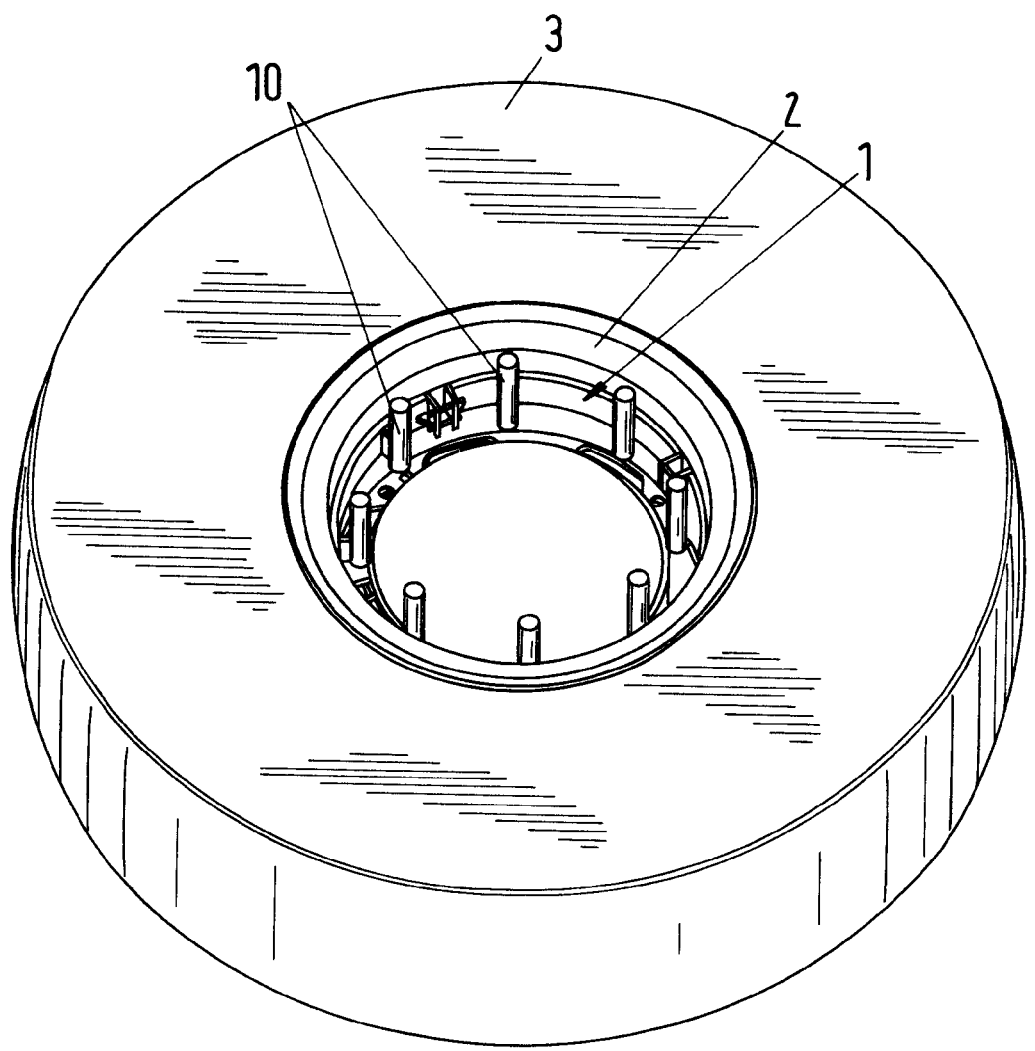
FIG. 2 shows in a perspective illustration a part of a holder of the protective device according to FIG. 1 that is mounted in a wheel rim.
Figure 3:
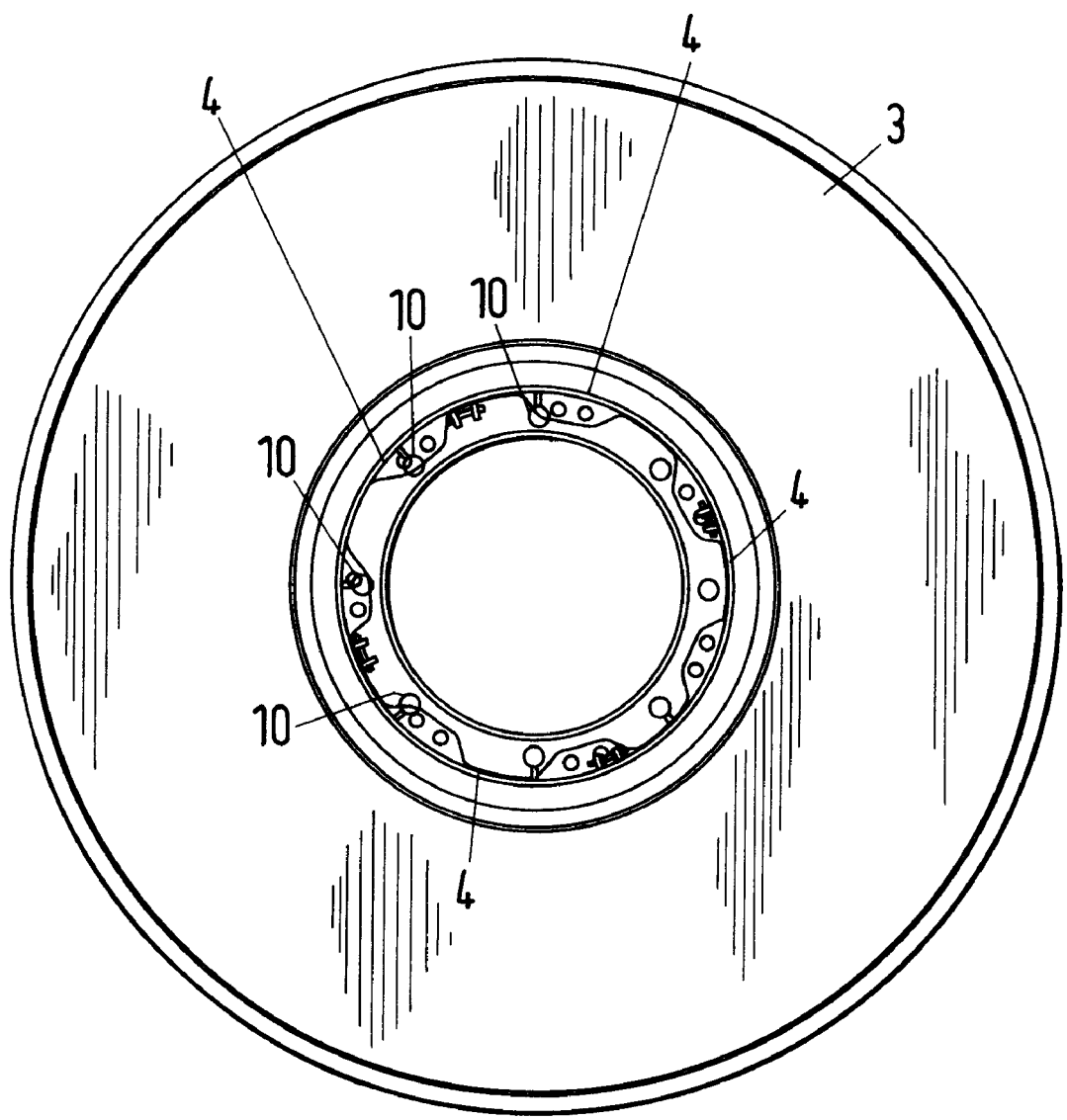
FIG. 3 is a plan view onto the tire according to FIG. 2.
Figure 4:
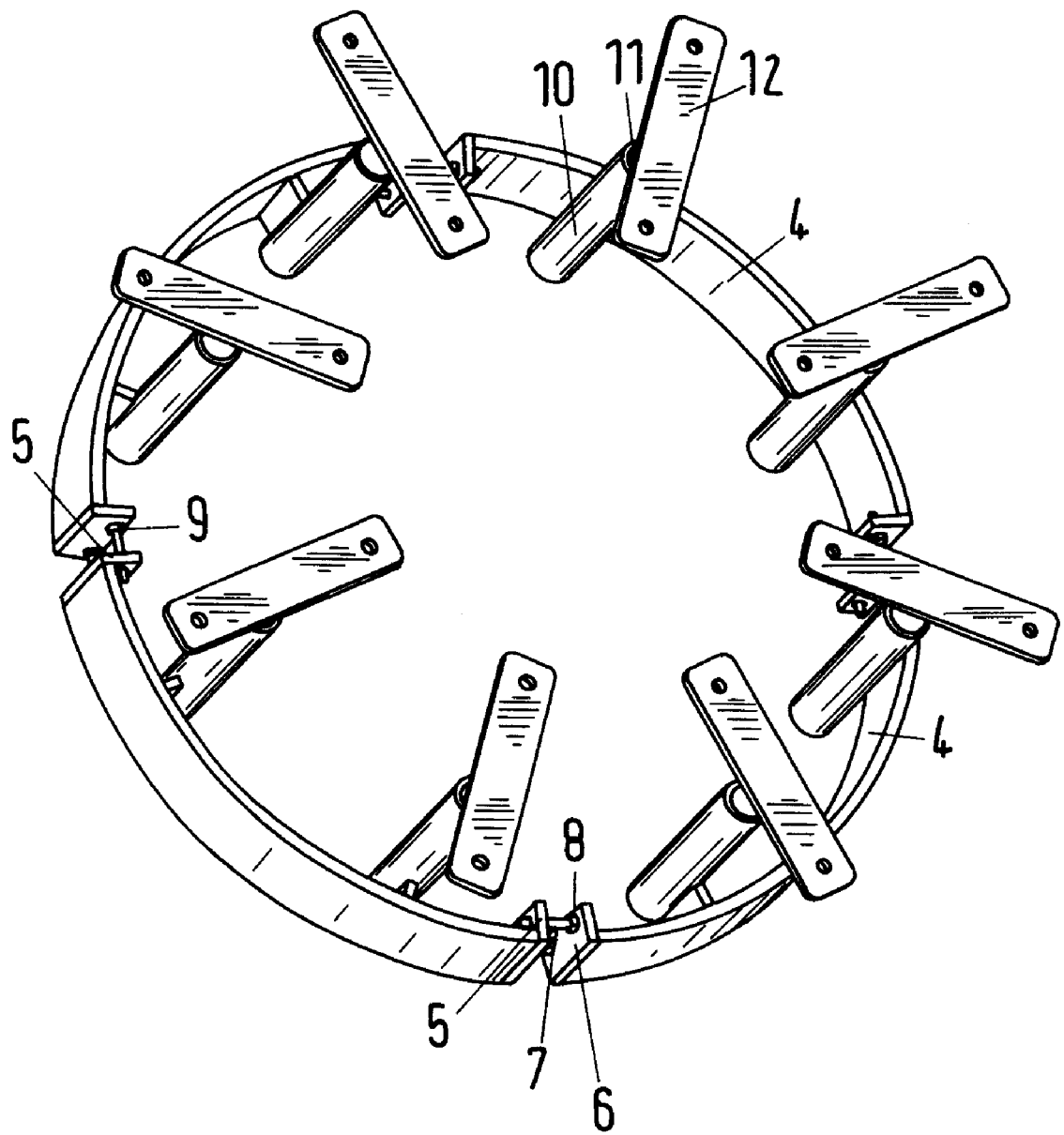
FIG. 4 shows in a perspective illustration a part of the holder of the protective device according to the invention.
Figure 5:
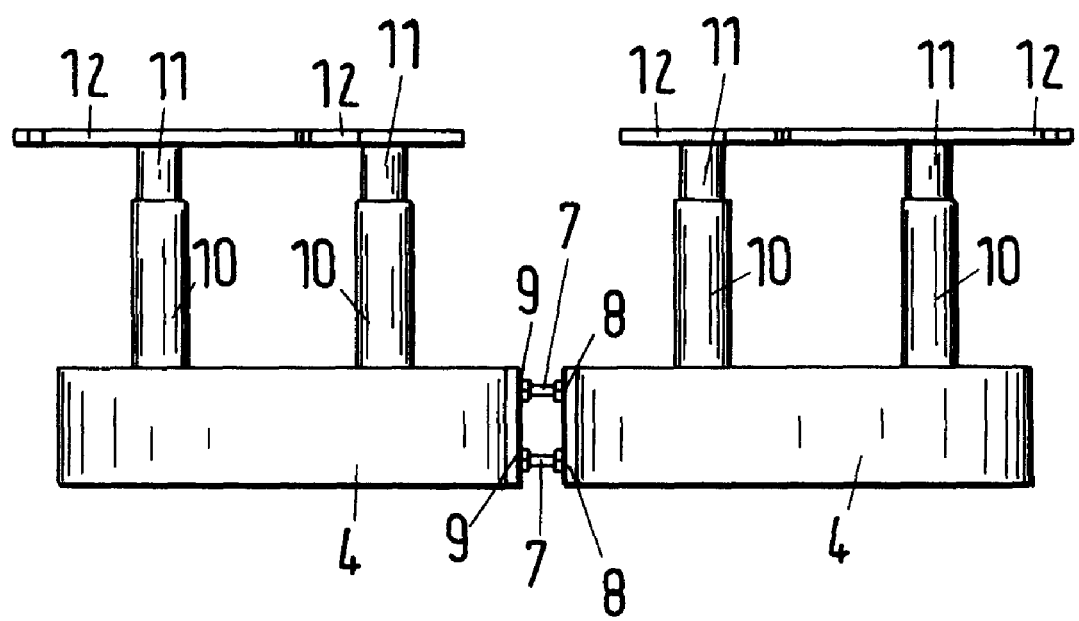
FIG. 5 is a side view of the holder according to FIG. 4.
Figure 7:
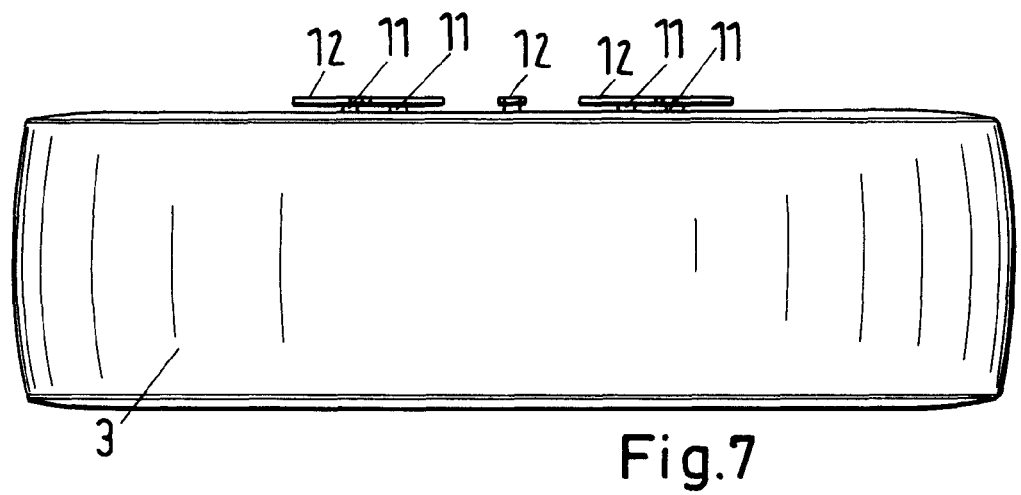
FIG. 7 is a plan view onto the tire according to FIG. 6.
Figure 6:
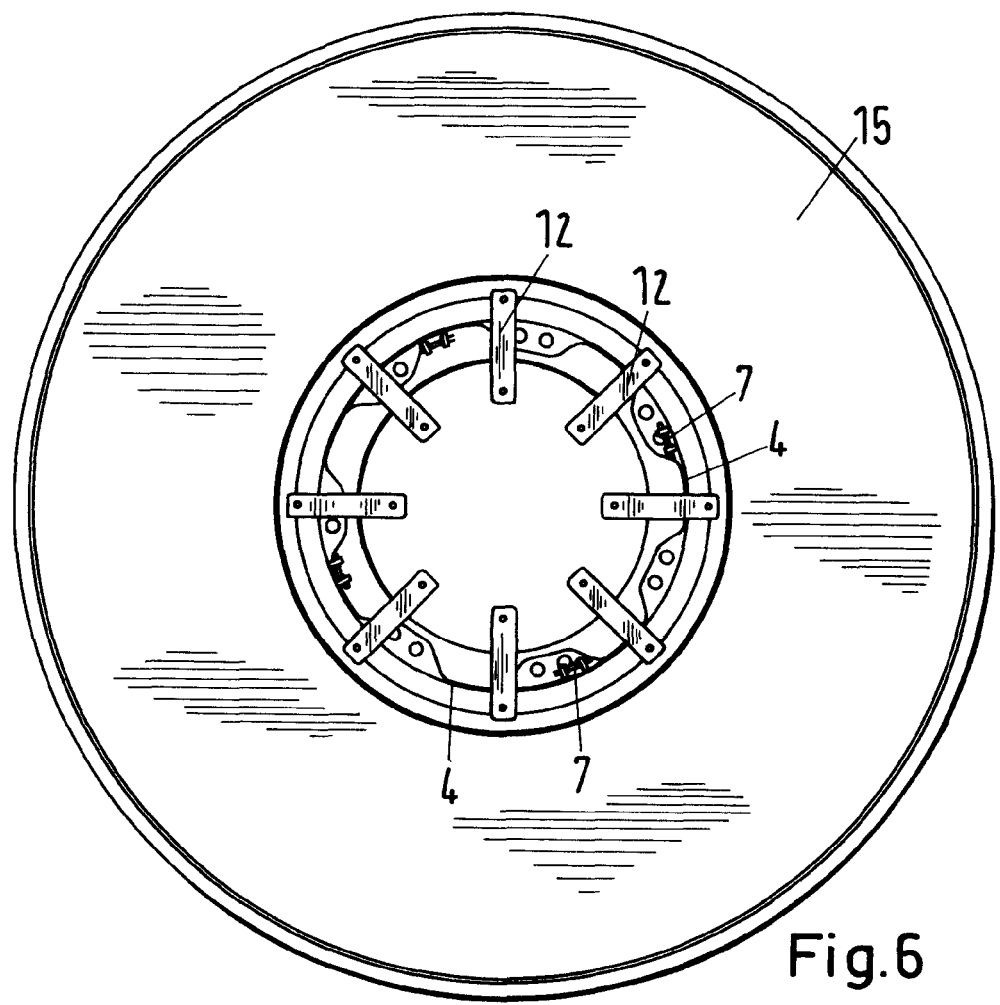
FIG. 6 is a plan view onto a tire into whose wheel rim the holder according to FIGS. 4 and 5 is inserted.

The protective device has an annular coupling member 1 with which it is attached in a releasable way on the wheel rim 2 of a tire 3 to be protected (FIGS. 1 and 2). The coupling member 1 that is a part of a holder of the protective device is preferably in the form of a circular ring whose outer diameter can be adjusted for being matched to the inner diameter of the wheel rim 2. In the embodiment, the coupling member 1 is comprised of four coupling parts 4 that are advantageously of the same length and whose ends are provided with radial inwardly oriented tabs 5, 6. Neighboring coupling parts 4 are connected to one another by at least one connecting screw 7, preferably two connecting screws 7, respectively, that project through the tabs 5, 6 of neighboring coupling parts 4. Nuts 8, 9 are positioned on the connecting screws 7 on the sides of the tabs 5, 6 that are facing one another and secure the spacing between neighboring coupling parts 4. By means of the connecting screws 7 the coupling parts 4 can be adjusted continuously relative to one another. In this way, it is possible without problems to adjust the coupling member 1 exactly to the inner diameter of the wheel rim 2. As shown in FIG. 2, the annular coupling member 1 rests with the exterior sides of its coupling part 4 of part-circular shape on the inner side of the wheel rim. By means of the connecting screws 7 the coupling parts 4 of part-circular shape can be placed optimally against the inner side of the wheel rim 2 with pretension. Since the coupling parts 4 are comprised of narrow upright elements of part-circular shape, the coupling member 1 occupies only little space in the wheel rim 2.

On the inner side of the coupling parts 4 there are two receptacles in the form of sleeves 10, respectively, that are welded advantageously to the coupling parts 4. The sleeves 10 are distributed uniformly about the circumference of the coupling member 1 and are of the same configuration. Their lower end in FIG. 1 is positioned at the level of the lower edge of the coupling parts 4 while they project past the other longitudinal rim of the coupling parts 4. As shown in FIG. 2, the sleeves are only of such a length that they do not project past the wheel rim 2 when the coupling member 1 is mounted.

The sleeves 10 serve for receiving insertion parts 11 that are axially adjustably inserted into the sleeves 10. In this way it is possible to precisely position the insertion parts 11 in the sleeves 10. Since the insertion parts 11 are inserted independent from one another into the correlated sleeves 10, mounting of the protective device on the tire 3 can be done optimally such that the protective device assumes precisely the required position for the protective function of the tire 3. In order to achieve the axial adjustability of the insertion parts 11 relative to the sleeves 10, the insertion parts 11 can be embodied, for example, as threaded parts that are screwed into the sleeves 10.

In another embodiment (not illustrated) the insertion parts 11 can be movably supported to a limited extent relative to the sleeves 10. The sleeves 10 can have, for example, an elongate opening through which a pin fixedly connected to the insertion part 11 projects. In the sleeve 10 there is at least one pressure spring such as a coil spring or plate spring by means of which the insertion part 11 is loaded axially outwardly. Normally, the pin of the insertion part 11 rests on the upper edge of the sleeve opening. Upon loading of the insertion part 11 during use of the protective device, the insertion part 11 can be pushed against the spring force into the sleeve 10. In this way, damage of the insertion part 11 or the sleeve 10 or components connected to the insertion part can be prevented.

The pressure spring can be arranged outside of the sleeve 10 and, for example, surround the insertion part 11. The pressure spring is supported in this case at the upper end of the sleeve 10 and on a stop attached to the insertion part 11.

The insertion parts 11 are provided at one end with a transversely projecting tab 12. The insertion parts 11 adjoin, for example, at half their length the tabs 12.

Figure 8:
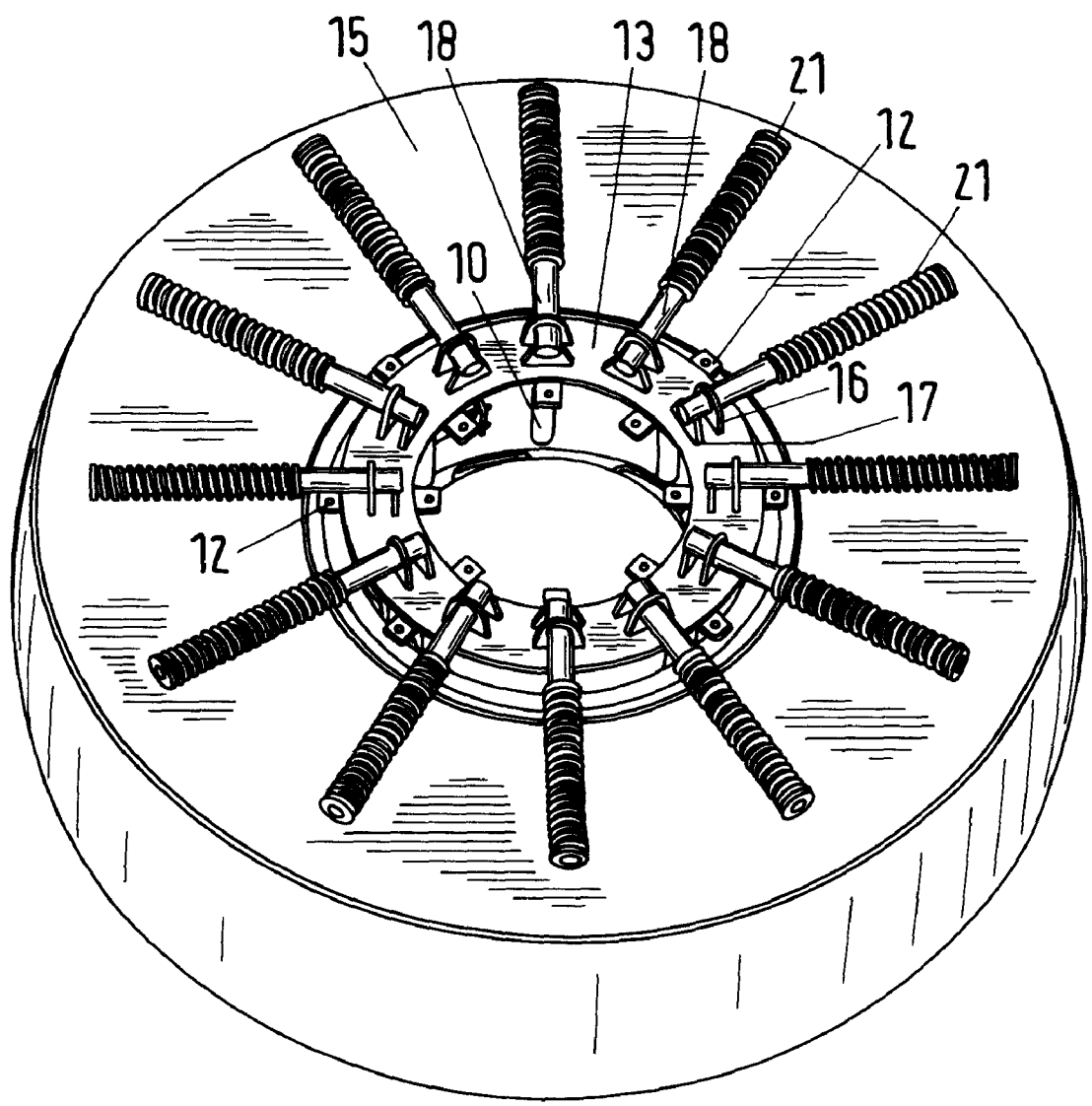
FIG. 8 shows in a perspective illustration the protective device mounted on the tire.
Figure 10:
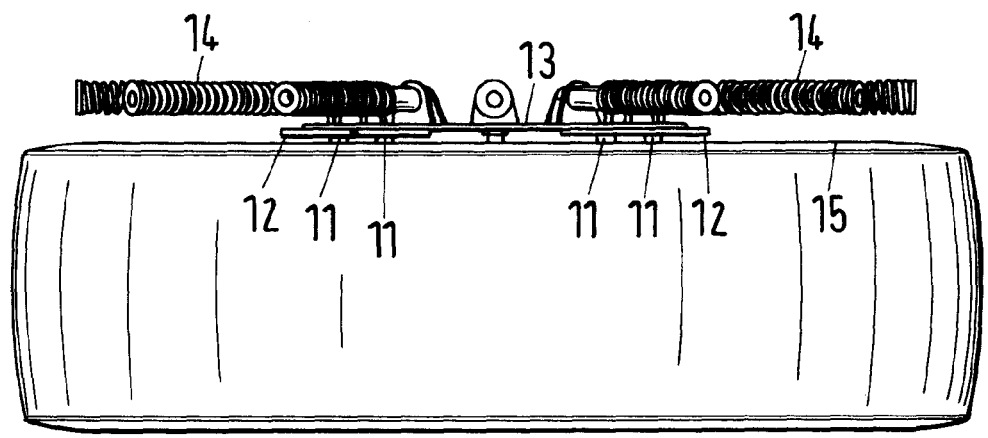
FIG. 10 is a plan view onto the tire with mounted protective device according to FIG. 9.

In the mounted position, a ring 13 rests on the tabs 12 to which ring protective elements 14 of the protective device are connected. By means of the ring 13 the protective elements 14 are connected to the coupling member 1. The ring 13 is configured as a flat annular disk that is resting with its bottom side flat on the narrow tabs 12. In the mounted position the tabs 12 are positioned approximately radially relative to the coupling member 1 and project in the radial direction inwardly and outwardly past the ring 13 (FIG. 8). Since the ring 13 is embodied as a flat annular disk, in the mounted position of the protective device it projects only little past the tire 3 (FIG. 10). Moreover, the insertion parts 11 are inserted into the sleeves 10 such that the tabs 12 also have only minimal spacing from the tire wall 15 (FIG. 10).

Figure 9:
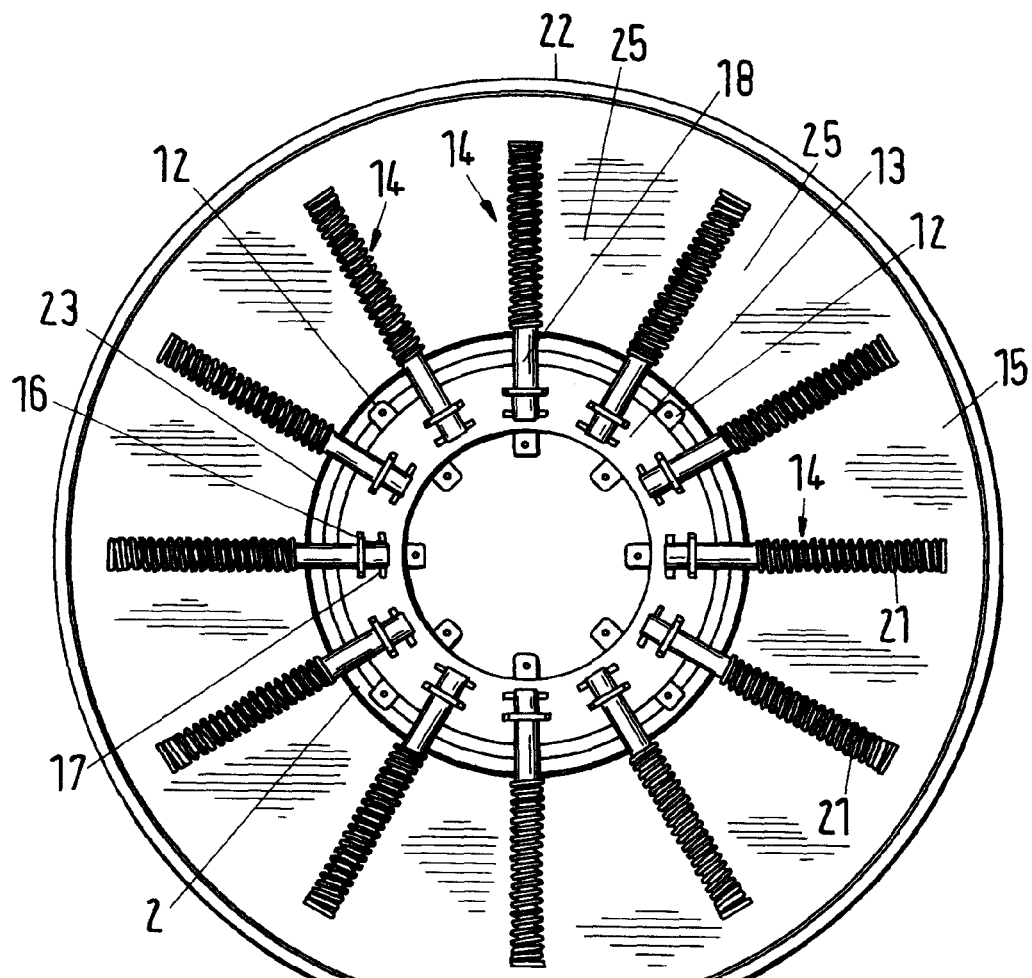
FIG. 9 shows in a side view the protective device according to FIG. 8 mounted on the tire.

On the side of the ring 13 facing away from the tabs 12 upright securing tabs 16, 17 are attached, preferably by welding, with which the protective elements 14 are attached to the ring 13. The securing tabs 16, 17 are positioned upright on the ring 13. The holding tabs 16 positioned closer to the outer rim of the ring 13 are penetrated by an axle 18 of the protective elements 14. The free end of the axles 18 is attached to an end face depression of the radially inwardly positioned securing tabs 17. The securing tabs 16, 17 each have a spacing from the outer and inner rims of the ring 13. As shown in FIG. 9, the axles 18 of the protective elements 14 end at minimal spacing from the inner rim of the ring 13. Since the two securing tabs 16, 17 are positioned spaced apart sequentially behind one another in the radial direction, the axles 18 are reliably supported. Since the axles 18 to not project into the opening 20 surrounded by the ring 13 the interior of the wheel rim 2 is accessible even when the protective device is mounted. For example, when the protective device is mounted it is possible to adjust the coupling member 1 in order to achieve a safe contact of the coupling parts 4 on the inner wall of the wheel rim 2. The ring 13 covers in the mounted position the sleeves 10.

The axles 18 project radially outwardly past the ring 13 and support coil springs 21. The axles 18 project only so far into these springs 21 that they can be reliably and fixedly connected thereto. As can be seen in FIG. 1, the free end 22 of the axles 18 is positioned with minimal spacing away from the radial inner end of the respective spring 21. The section of the springs 21 projecting past the axle 18 corresponds, for example, to approximately four fifth of the length of the spring 21. This has the advantage that the part of the spring 21 that is projecting past the axle 18 is very flexible. The springs 21 are, of course, so stiff that they maintain their stretched position (FIG. 9) on the tire wall 15 also during travel and do not move back and forth uncontrollably.

The springs 21 are arranged such that they have minimal spacing from the ring 13 (FIG. 10) so that during use they do not constantly rub on the ring 13. So that an optimal sidewall protection is ensured, the springs 21 extend into the near vicinity of the tire running surface 22 in axial view of the tire. The springs 21 extend advantageously away from the radial outer edge 23 of the wheel rim 2. In this way, by means of the protective elements 14 the tire wall 15 of the tire 3 is optimally protected.

In order to avoid any danger by the springs 21 when mounting the protective device, onto the free spring ends advantageously a protective disk 24 is mounted that covers sharp ends of the springs 21. These protective disks 24 can be connected by welding. It is advantageous when the protective disks 24 are connected by means of a tensioning element (not illustrated), for example, a tensioning wire, with a tensioning device provided in or on the axle 18. Such a tensioning device can have, for example, a rotatable axle onto which an end of the tensioning part is wound. In this way, there is the possibility, by winding the tensioning part onto such an axle, to stabilize the respective spring 21 in its longitudinal direction by means of the protective disk 24. In this way, there is the possibility to adjust each spring individually with respect to a desired shape stabilization. For the user, there is therefore the possibility to adjust on site the individual springs 21 of the protective device optimally with regard to the application.

Figure 11:
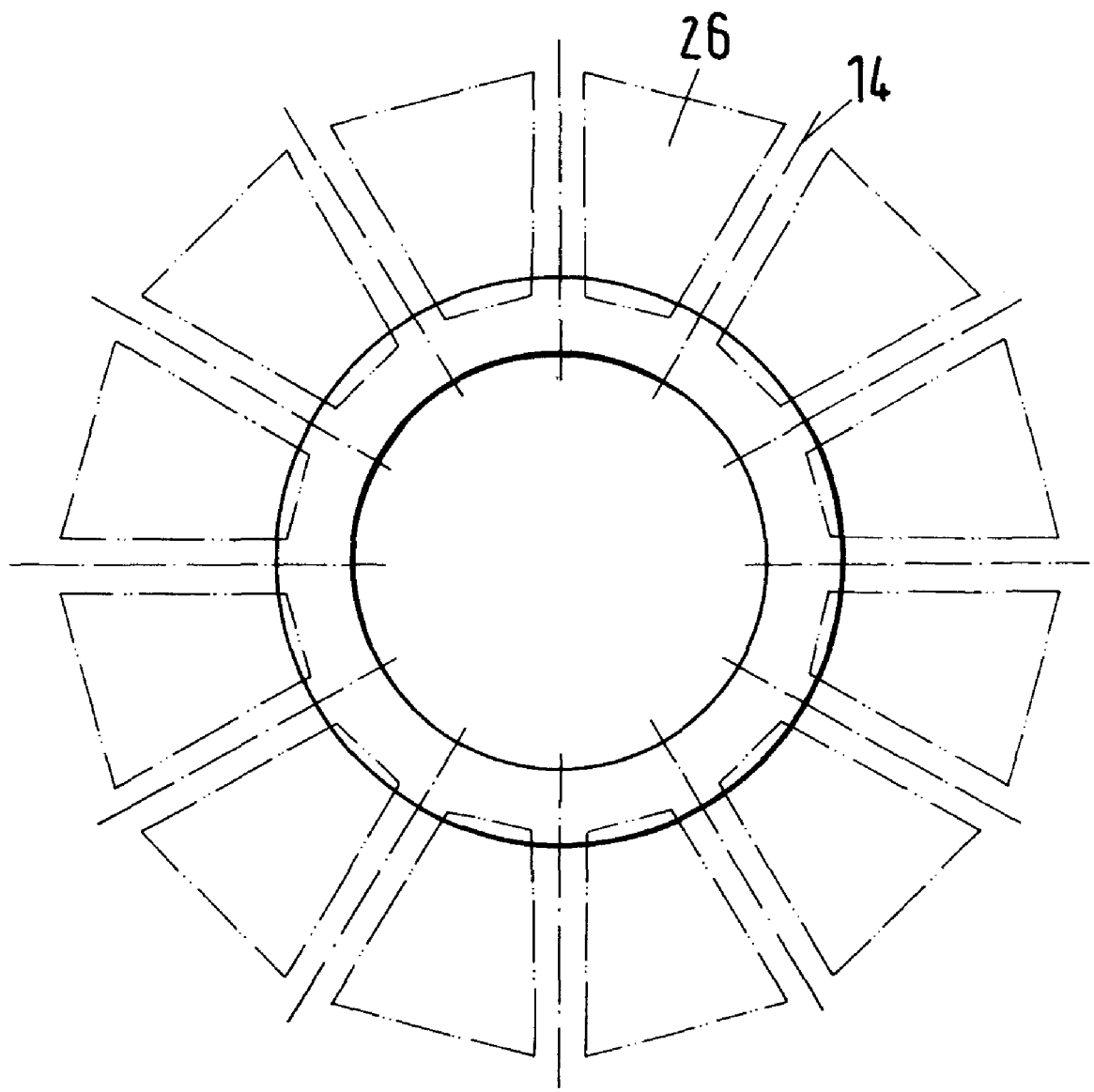
FIG. 11 shows in a schematic illustration and in an end view intermediate elements that are located between protective elements of the protective device and also serve for protection of the tire wall.

In the protective device according to FIGS. 1 to 10, the springs 21 have such a spacing relative to one another in the circumferential direction that between them intermediate spaces 25 are formed. In order for the tire wall 15 not to be damaged in these intermediate spaces 25, the intermediate spaces 25, as shown in FIG. 11, are covered by intermediate elements 26 at least for the most part. In FIG. 11, the protective elements 14 are illustrated by dash-dotted lines. Also, the intermediate elements 26 are shown only schematically. The protective device has advantageously identical intermediate elements 26. In principle, it is however also possible to arrange in the immediate spaces 25 differently designed intermediate elements 26.

Based on FIGS. 12 through 20 different embodiments of intermediate elements 26 will be explained in more detail.

Figure 12:
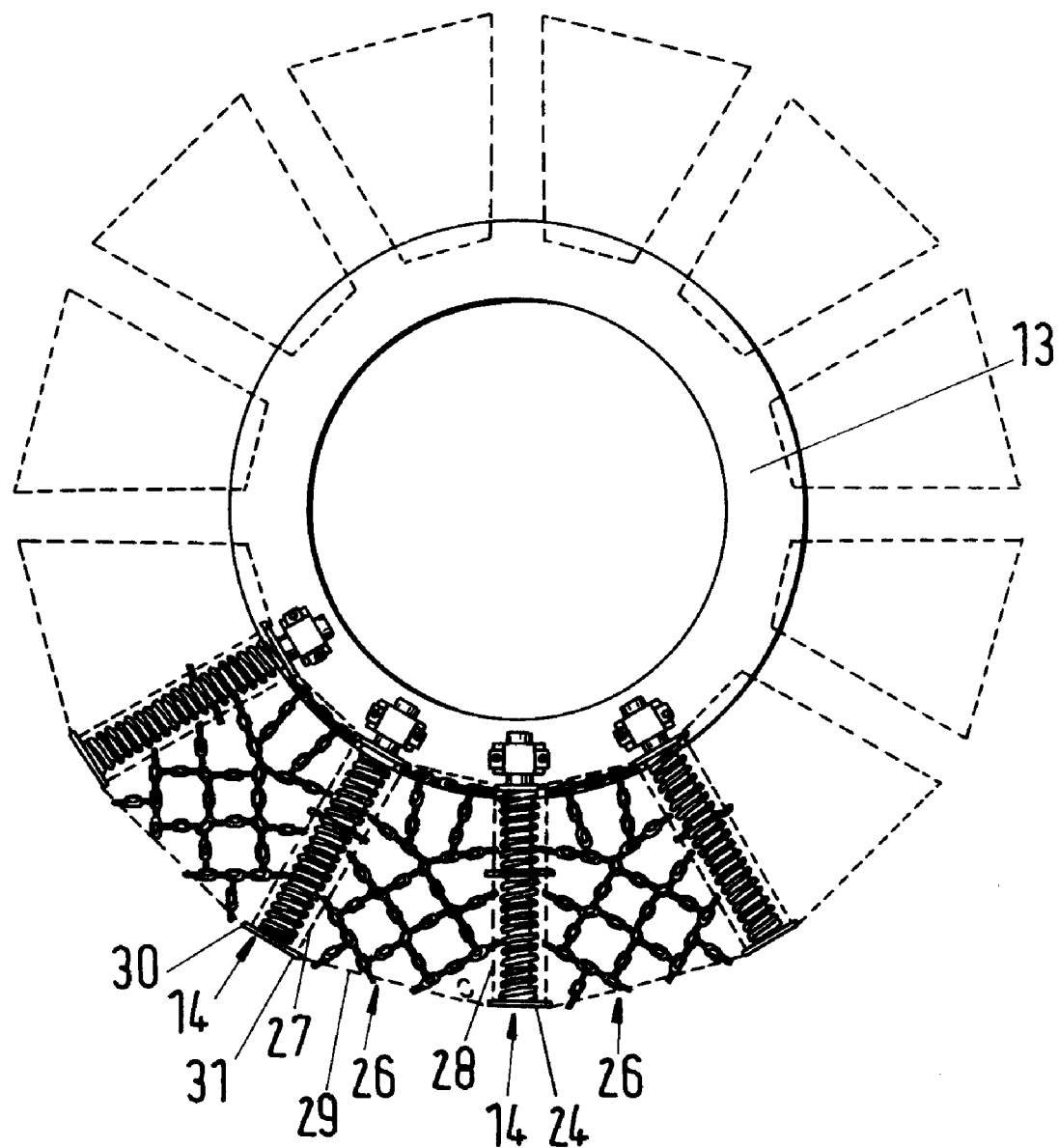
FIG. 12 shows an embodiment of an intermediate element of the protective device according to the invention.
Figure 13:
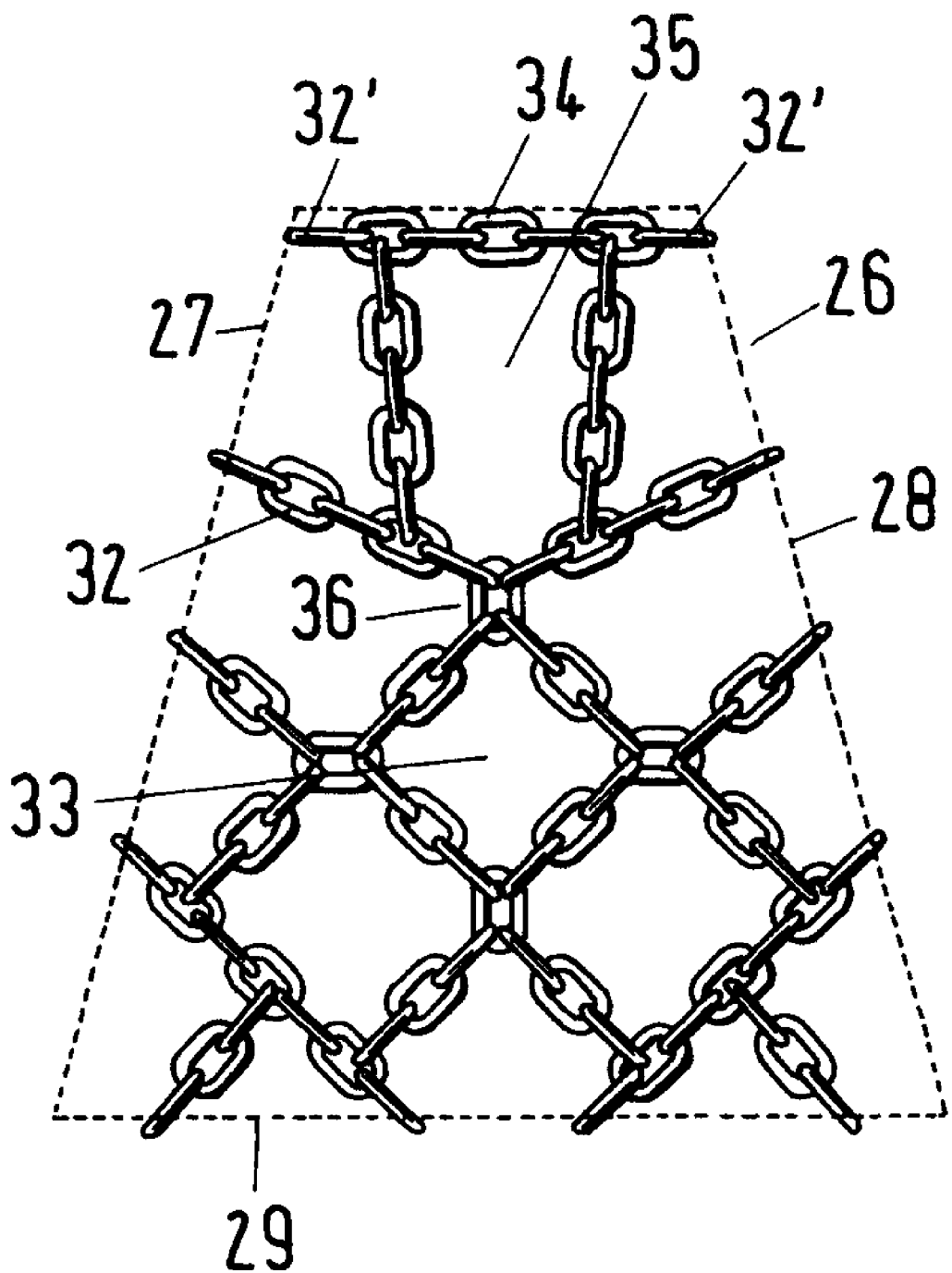
FIG. 13 shows in an enlarged illustration the intermediate element according to FIG. 12.

In the embodiment according to FIGS. 12 and 13 the intermediate elements 26 are formed by small chain nets. In order to be able to connect them to the protective elements 14, alongside the protective elements 14 connecting parts 27, 28 are provided which extend essentially parallel to the protective elements 14, in particular to the springs 21. These connecting parts 27, 28 are advantageously formed by wires that extend approximately across the length of the springs 21 and are attached with their radial inner ends to the axle 18. Chain links of the chain net 26 are hooked to the connecting parts 27, 28. Advantageously, the connecting parts 27, 28 are of a one-piece configuration with one another. The connecting parts 27, 28 have at their outer ends a transition into one another so that a radially outer connecting part 29 is formed that extends in the circumferential direction and into which chain links of the chain net 26 are hooked also. On the protective disks 24 annular eyes 30, 31 are welded diametrically opposed to one another through which the wire that forms the connecting parts 27 to 29 is guided. The deflection of the wire takes place in the eyes 30, 31.

The configuration of the chain net 26 can be seen in FIG. 13. Accordingly, this chain net is comprised of oval chain links 32 that engage one another and define in a central area a rectangular mesh opening 33. The sides of the mesh openings 33 are each formed by three chain links 32.

At the point of intersection of neighboring mesh openings 33 there are chain links 32 that are lying flat while the chain links 32 that are hooked at the connecting parts 27 to 29 are arranged upright on the tire wall 15. The chain net 26 is radially inwardly delimited by a chain length 34 that is also formed of oval chain links 32 engaging one another. The chain links 32' at the end of this chain length 34 can be hooked in the connecting locations 27, 28. However, it is also possible to provide on the axle 18 of the protective elements 14 tabs into which the chain links 32' are hooked. A part of the chain length 34 delimits a chain mesh 35 that is greater than the chain mesh 33 of the remaining chain net 26. In the embodiment according to FIGS. 12 and 13 the larger chain mesh 35 is delimited at two opposed longitudinal sides by five chain links 32 each. The chain net is thus in the radial outer area of a tighter mesh than in the inner area because in general during use the inwardly positioned area of the tire wall 15 is less at risk than the radial outer area.

As a result of the disclosed exemplary configuration the chain net 26 has across most of the radial width of the tire wall 15 small mesh openings 33. Therefore there is no risk that stones or the like when the tire travels across will cause damage to the tire walls 15. But also near the radial inwardly positioned area having the greater mesh openings 35 the mesh openings are still so small that this area of the tire wall 15 is protected sufficiently from becoming damaged.

Figure 14:
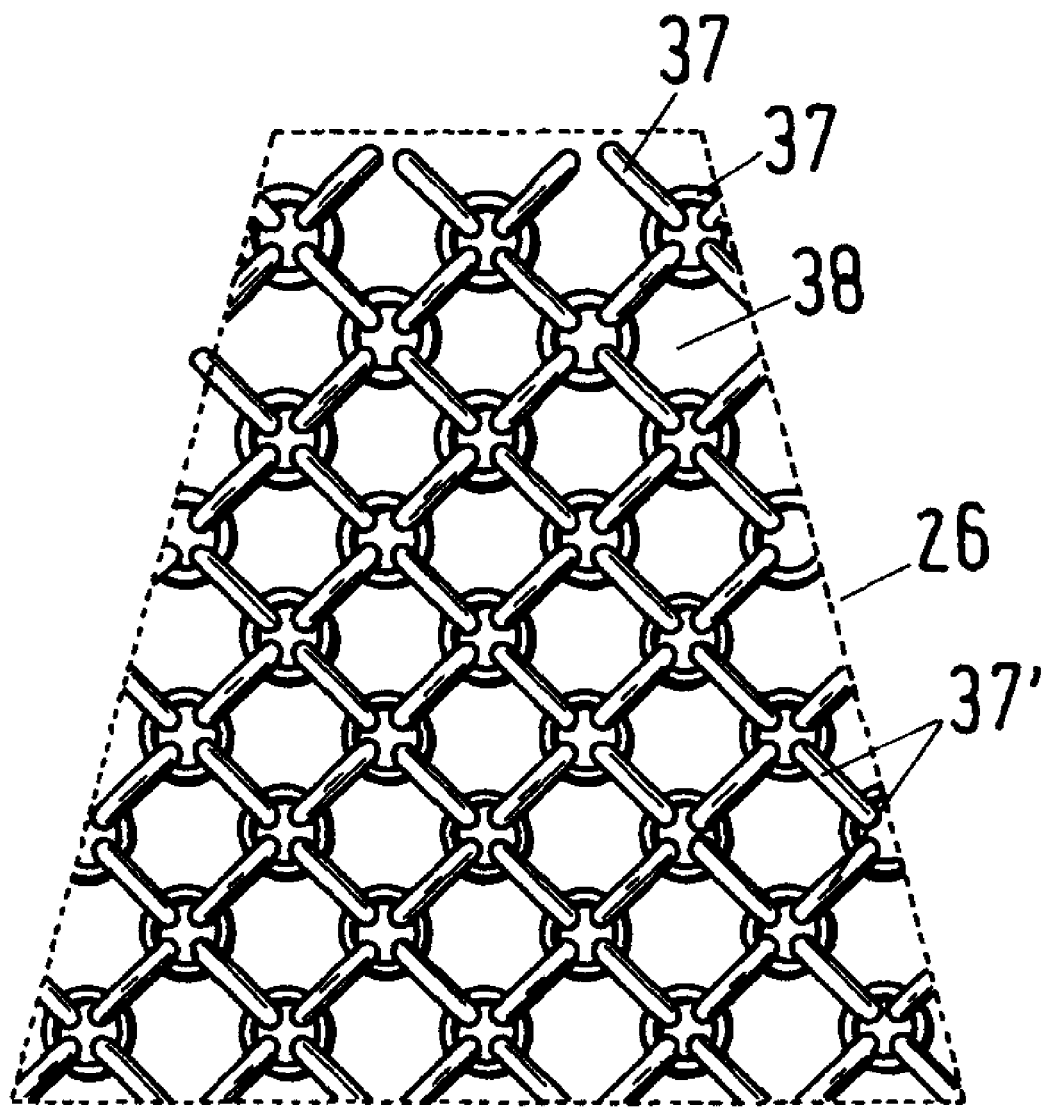
FIG. 14 shows a further embodiment of an intermediate element in an illustration according to FIG. 13.

FIG. 14 shows that the chain net 26 may also be formed of circular chain links 37 that engage one another. They are arranged such that rectangular mesh openings 38 are produced, wherein sides of the openings are formed by a ring member 37. In this embodiment, the chain net 26 has the same mesh openings 38 all over. Since they are very small, a very tight-mesh chain net results that optimally protects the tire wall 15 even in regard to smaller objects. The chain links 37' that are arranged upright relative to the tire can also be formed at least partially by stud links.

Figure 15:
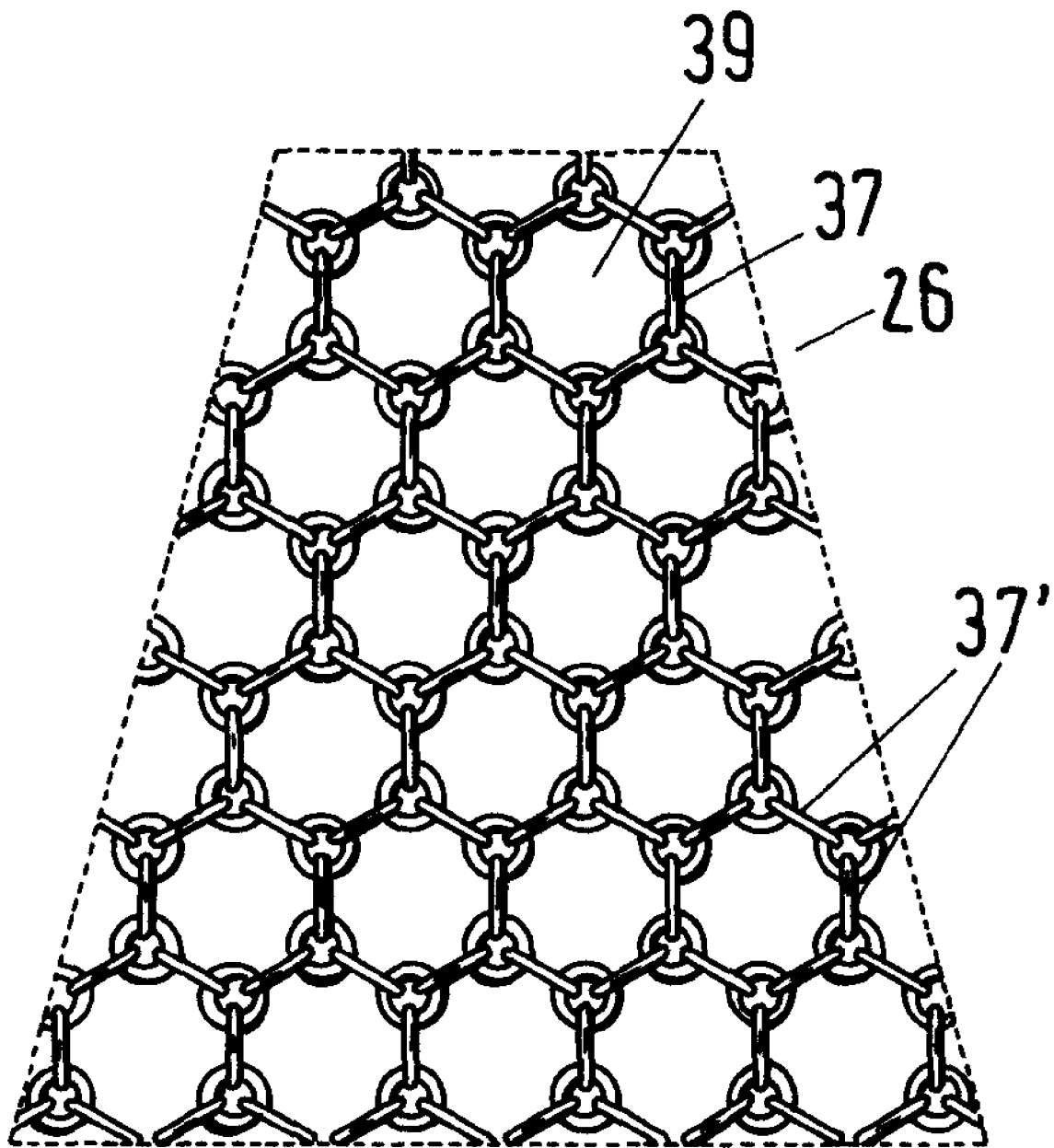
FIG. 15 shows a further embodiment of an intermediate element in an illustration according to FIG. 13.

In the embodiment according to FIG. 15 the chain net 26 has hexagonal mesh openings 39 whose sides are formed by a chain link 37, respectively. As in the embodiment according to FIG. 14 for the chain net 26 circular ring members 37 of same size are used. This chain net 26 also has a tight mesh that protects the tire wall 15 optimally from damage. As in the preceding embodiment, the chain net 26 has substantially same size mesh openings 39. In this embodiment, the chain links 37' that are arranged upright on the tire can be formed at least partially by stud links.

Figure 16:
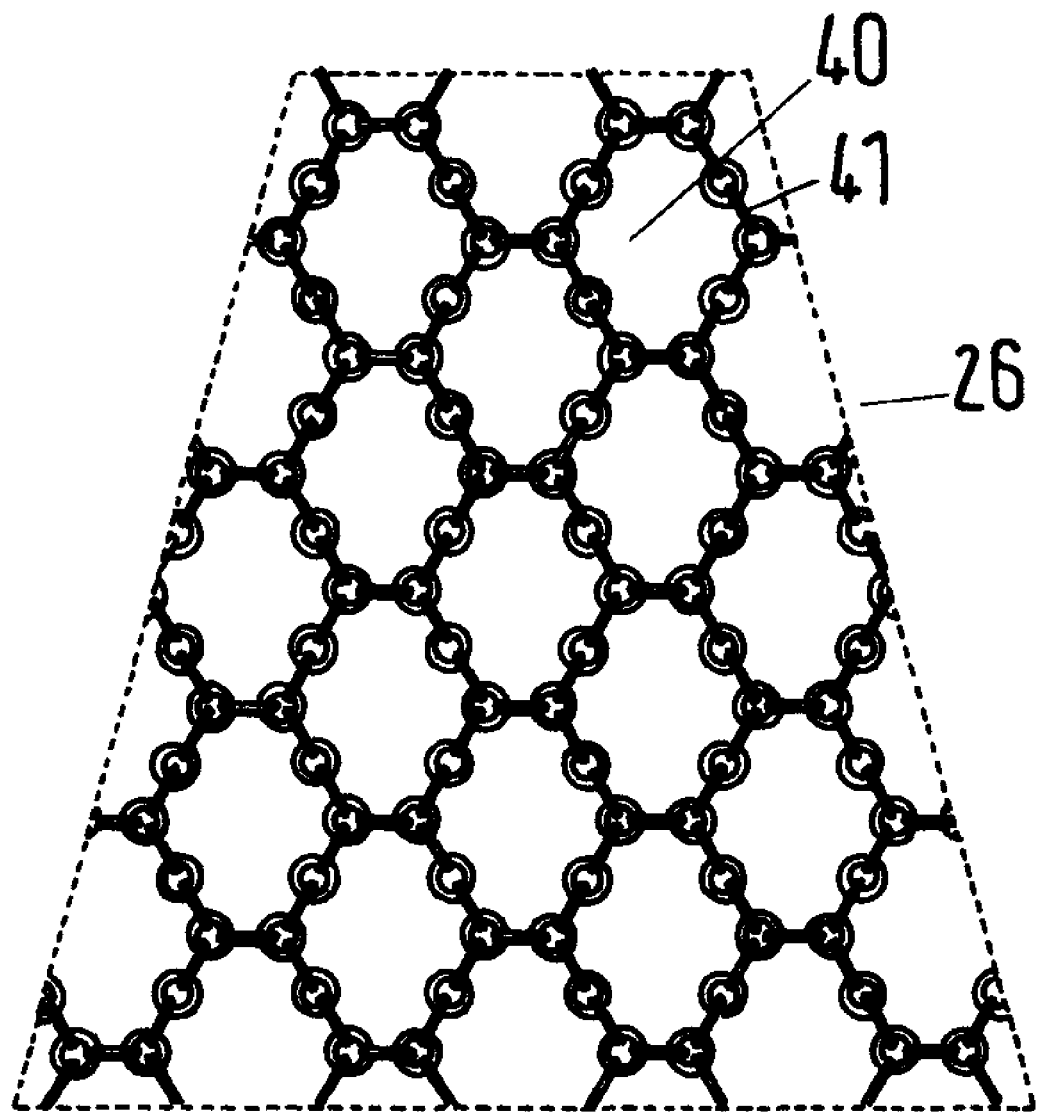
FIG. 16 shows a further embodiment of an intermediate element in an illustration according to FIG. 13.

The chain net 26 according to FIG. 16 has also hexagonal mesh openings 40 that are however greater than the mesh openings 39 according to FIG. 15. Four of the sides delimiting the mesh openings 40 are delimited by three ring members 41 while two oppositely positioned sides of the mesh openings are delimited by only one chain link. Since the chain net 26 has substantially same-size mesh openings 40, as in the embodiment according to FIGS. 14 and 15, a uniform protection of the tire wall 15 results. The mesh openings 40 are still sufficiently small in order to ensure excellent protection of the tire wall 15.

Figure 17:
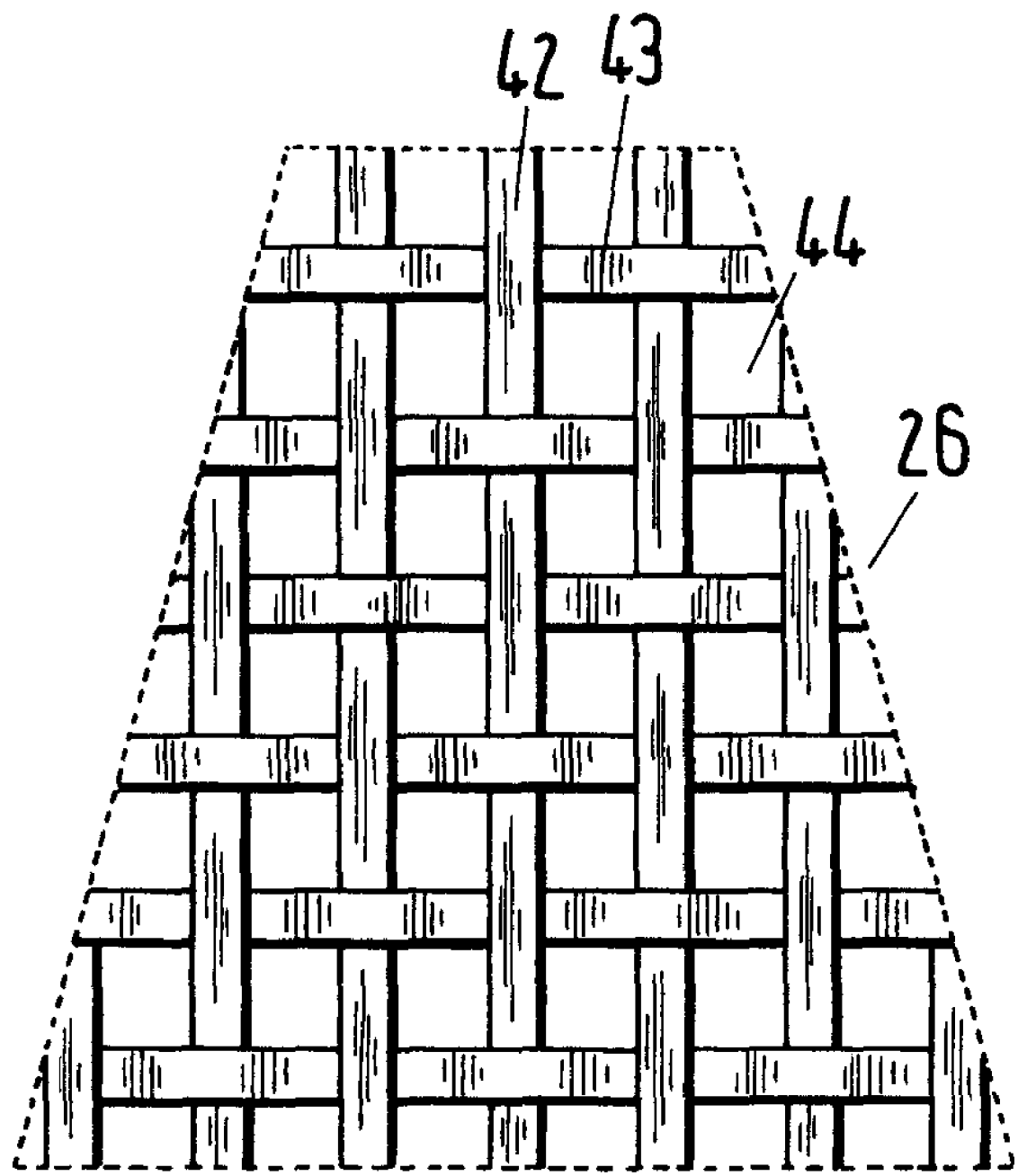
FIG. 17 shows a further embodiment of an intermediate element in an illustration according to FIG. 13.

FIG. 17 shows an embodiment of an intermediate element 26 that is not formed of chain links but of a type of fabric. It is comprised of crossing broad strips 42, 43 that are comprised of a wear-resistant material. The strips 42, 43 form rectangular mesh openings 44 that are arranged uniformly distributed within intermediate element 26. The intermediate element 26 can be attached without problem to the connecting parts 27 to 29.

Figure 18:
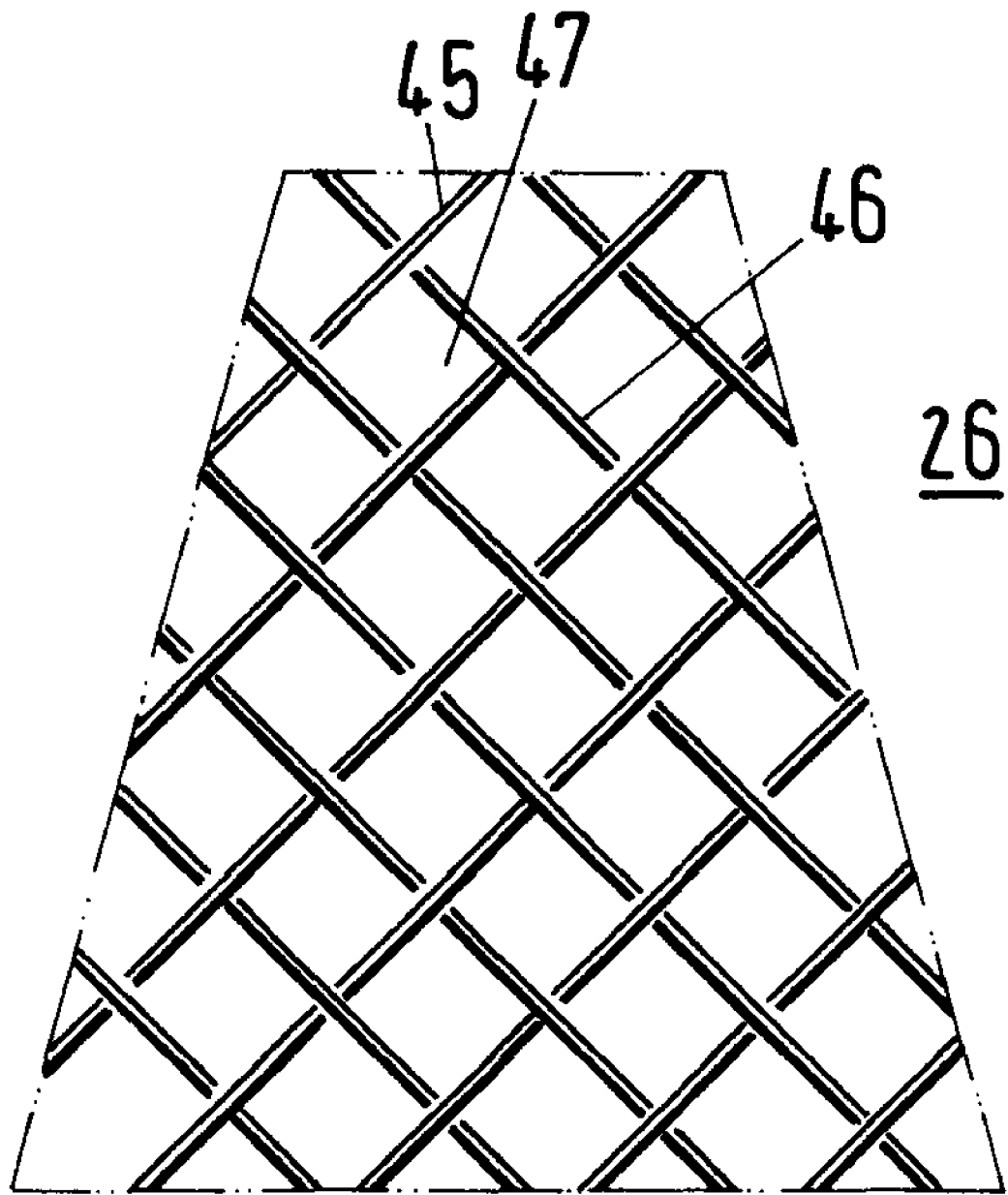
FIG. 18 shows a further embodiment of an intermediate element in an illustration according to FIG. 13.

The intermediate element 26 according to FIG. 18 is also formed as a fabric that is comprised of crossing strips 45, 46 that in comparison to the preceding embodiment are narrow and form rectangular mesh openings 47. The mesh openings are larger than in the preceding embodiment but still so small that they enable a reliable protection of the tire walls 15. The mesh openings 47 as the mesh openings 33 (FIGS. 13) and 38 (FIG. 14) are arranged such that one diagonal of the mesh openings extends radially relative to the tire 3.

Figure 19:
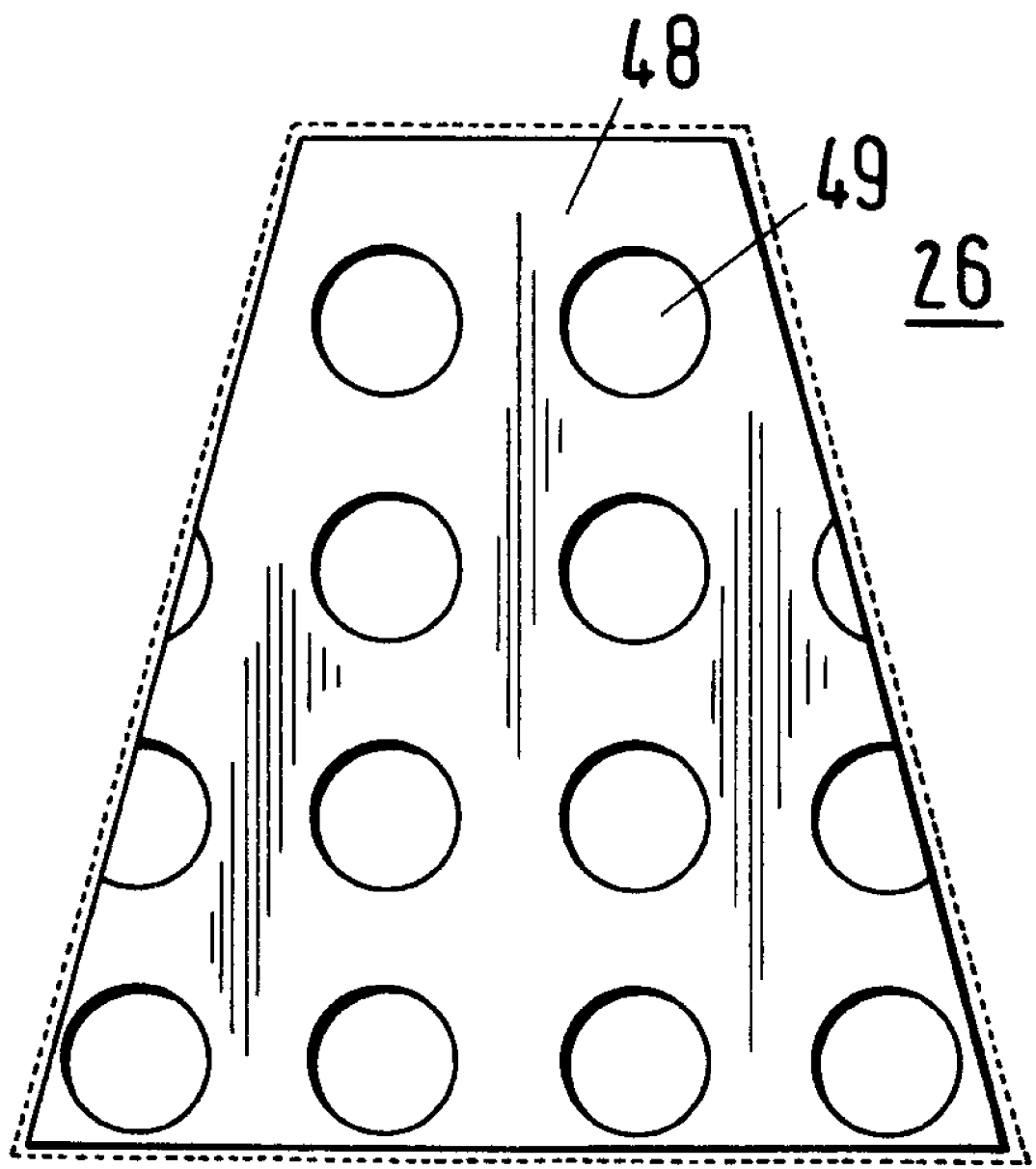
FIG. 19 shows a further embodiment of an intermediate element in an illustration according to FIG. 13.

FIG. 19 shows an intermediate element 26 that is formed by a fabric 48 that is provided with distributed, advantageously same size, openings 49. They have, for example, a circular contour. The fabric 48 can be attached in accordance with the preceding embodiments to the connecting parts 27 to 29 without problem. The fabric 48 is flexible so that it can follow the movements of the springs 21 during use of the protective device.

Figure 20:
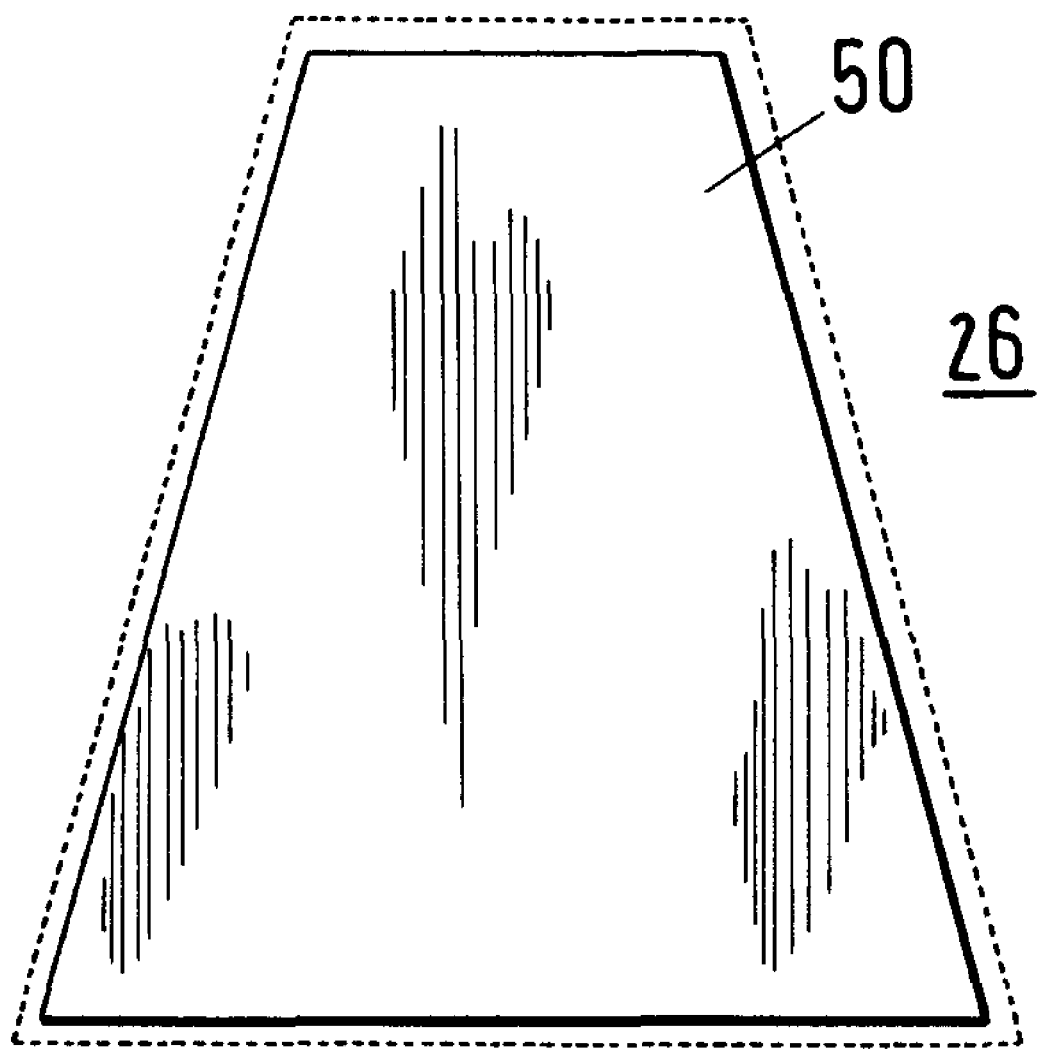
FIG. 20 shows a further embodiment of an intermediate element in an illustration according to FIG. 13.

FIG. 20 shows finally an intermediate element 26 that is comprised of closed fabric 50. As in the preceding embodiments it is matched with its contour to the contour of the intermediate space 25 between neighboring protective elements 14. The fabric 50 is connected along its edges to the connecting parts 27 to 29. In accordance with the preceding embodiments the fabric 50 is also sufficiently flexible in order to be able to follow the movements of the springs 21 when the protective device is in use.

The mounted protective device covers the tire wall 15 almost completely. In this way, a high protective action with regard to damage and/or cuts by objects in the ground is provided. In particular when tires of a vehicle furnished with such protective devices travel across rocks, stones, scrap metal, slag or the like this danger is imminent. However, since the protective device covers the tire walls, the risk of damage or injury of the tire is only minimal. The protective device is characterized in particular in that it is flexible and can follow the tire deformations in any direction. The springs 21 not only can bend elastically in the circumferential direction of the tire wall but also can bend away transverse to the tire wall 15. There is even the possibility that the springs 21 under corresponding load are compressed. The intermediate elements 26 located between the springs 21 can follow as a result of their flexibility these movements so that there is no risk that the intermediate elements 26 as a result of movements of the springs 21 become damaged. The springs 21 and thus also the intermediate elements 26 return upon relief into their initial position. Should objects penetrate between the protective device and the tire walls 15, they are moved outwardly as a result of the flexibility already after a short travel distance so that the load of the tire wall is only minimal. That such objects between tire wall 15 and protective device can quickly be discharged outwardly is favored by the open structure of the intermediate elements 26. Smaller objects pass through the mesh or mesh openings in the intermediate elements 26 already after a short travel distance without problems to the exterior while larger objects as a result of the described flexibility of the protective device also reach the exterior after a short travel distance.

Since the protective device may be arranged at only minimal spacing from the tire wall (FIG. 10) the risk is already minimal that objects will penetrate between tire wall 15 and the protective device.

Figure 21:
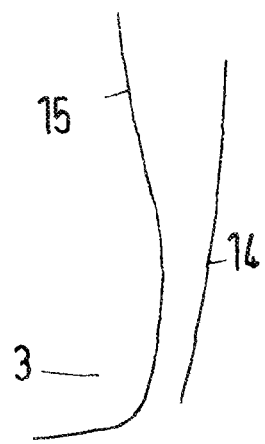
FIG. 21 shows in a schematic illustration and in a side view positioning of the protective device on the tire.
Figure 22:
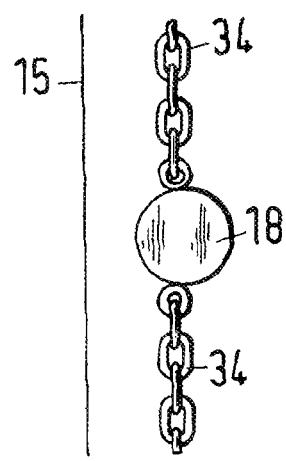
FIG. 22 shows the attachment of the intermediate elements on a protective element of the protective device according to the invention.
Figure 23:
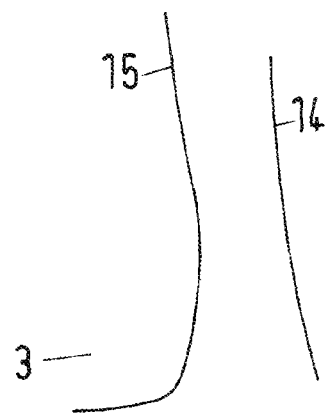
FIG. 23 shows in an illustration corresponding to FIG. 21 a further possibility of the position of the protective device relative to the tire.

In the described embodiments the protective elements 14 or the springs 21 extend substantially parallel to the tire wall 15 (FIG. 10). It is however also possible that the protective elements 14, as schematically shown in FIG. 21 or 23, are positioned at an angle relative to the tire wall 15 of the tire 3. In this connection, in accordance with FIG. 21, the spacing between the tire 3 and the protective elements 14 can decrease outwardly in the radial direction or, as shown in FIG. 23, can increase. This is achieved, as illustrated for a chain net as intermediate element 26, in such a way that the radially inwardly positioned chain lengths 34 of intermediate elements 26 are not attached diagonally opposite one another to the axles 18 of the protective elements 14 but off-center. In the embodiment according to FIGS. 21 and 22 the connection of the chain lengths 34 on the axles 18 is done axially displaced in the direction toward the tire wall 15. This has the result that upon tightening of the chain lengths 34 the springs 21 are bent in the direction of the tire wall 15.

Figure 24:
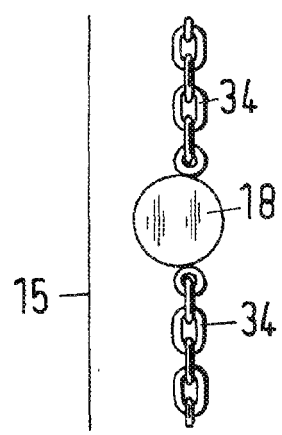
FIG. 24 shows in an illustration corresponding to FIG. 23 a further possibility of the position of the protective device relative to the tire.

In the embodiment according to FIGS. 23 and 24 the chain lengths 34 are attached to the axles 18 of the springs 21 in outwardly displaced position relative to the tire all 15. In this way, the springs 21 are bent away from the tire walls 15 when tensioning the chain lengths 34.

In this way, the protective device can be matched optimally to the respective tire 3 not only with regard to its shape but also taking into consideration the respective ground across which the vehicle must travel.

Figure 25:
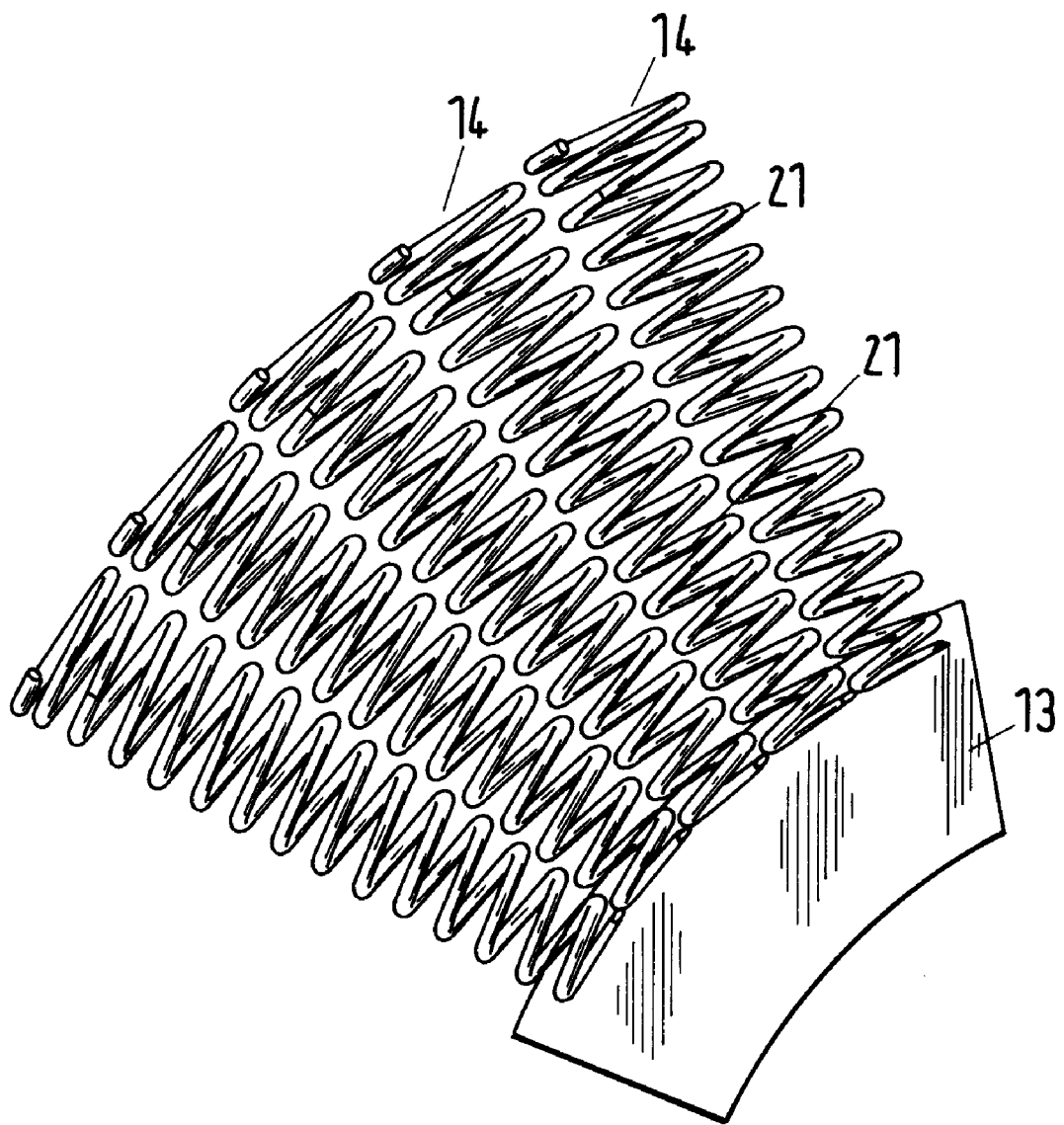
FIG. 25 shows in a side view a part of a further embodiment of a protective device according to the invention.

FIG. 25 shows an embodiment of a protective device in which the protective elements 14 are provided so tightly adjacent to one another that between them practically no intermediate spaces exist that would have to be covered by the intermediate elements. The intermediate elements 14 are comprised exclusively of the coil springs 21 that are immediately attached to the ring 13. In order for the springs 21 to be attached as tightly as possible adjacent to one another along the circumference of the ring 13, the springs 21 have conical shape. They have at the ring 13 the smallest diameter that increases continuously in the direction toward their radial outer end. As a result of this configuration of the springs 21 it is possible to keep the spacings between them minimal and in particular approximately identical across the radial length. The springs 21 have with respect to their function a satisfactory stiffness so that in the rest position they are in the position shown in FIG. 25. During travel the springs 21 remain also in this initial position. Only when the springs 21 impact on respective ground or objects on the ground, they are elastically bent. Should objects penetrate between the springs 21 and the tire wall 15, they are conveyed outwardly already after a short travel distance so that damage of the tire wall 15 is prevented. The springs 21, as in the preceding embodiment, are wound such that even smaller objects cannot penetrate from the exterior through the windings of the springs 21 to the tire wall 15.

Figure 26:
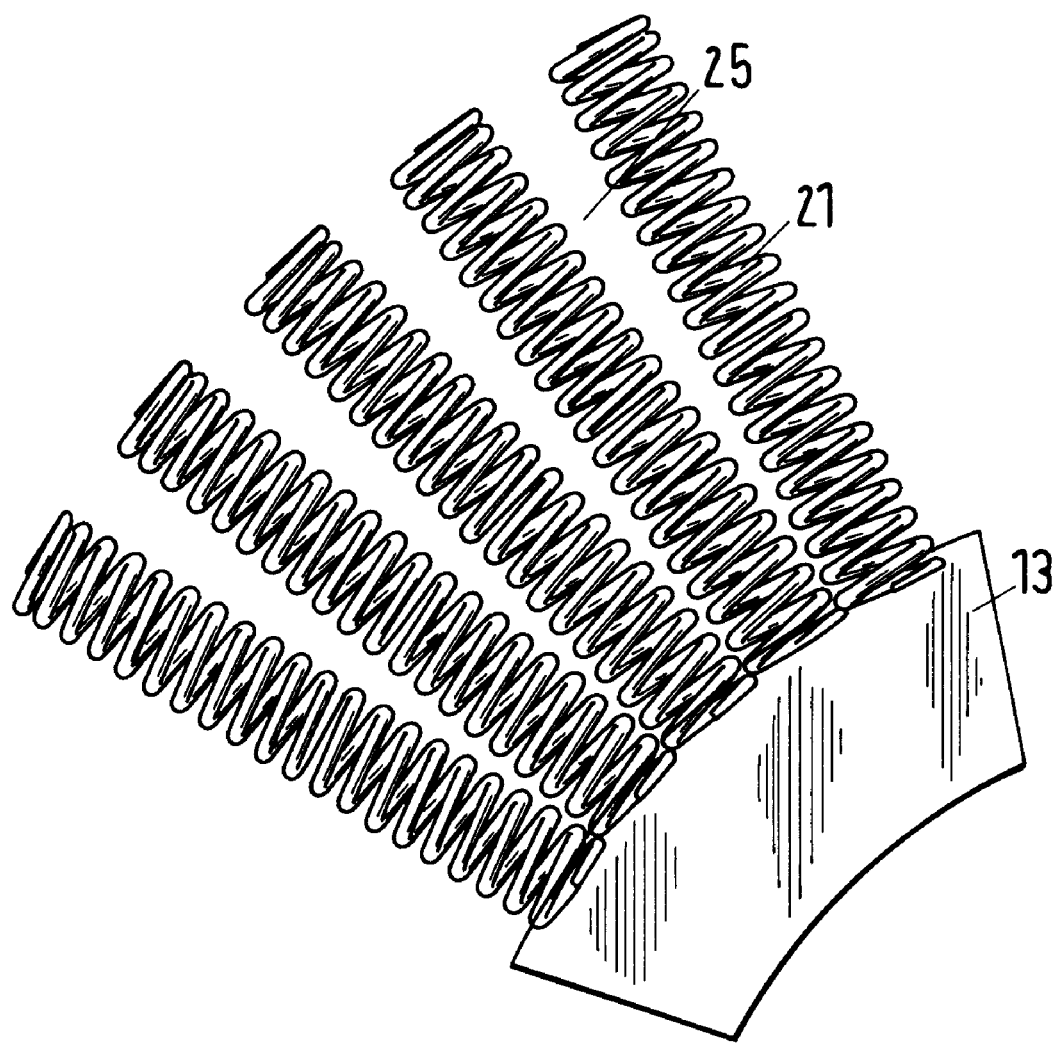
FIG. 26 shows in an illustration corresponding to FIG. 25 a further embodiment of a protective device according to the invention.

In the embodiment according to FIG. 26 the springs 21 have across their length a constant diameter. As in the embodiment according to FIG. 25 the springs 21 are attached immediately on the ring 13. Since the springs 21 have constant diameter, between neighboring springs 21 V-shaped small intermediate spaces 25 are formed whose width increases outwardly continuously in the radial direction.

These intermediate spaces 25 are however so small that they must not be covered by intermediate elements. In this embodiment, the springs 21 are wound so tightly that even smaller objects cannot penetrate from the exterior to the tire wall.

Figure 27:
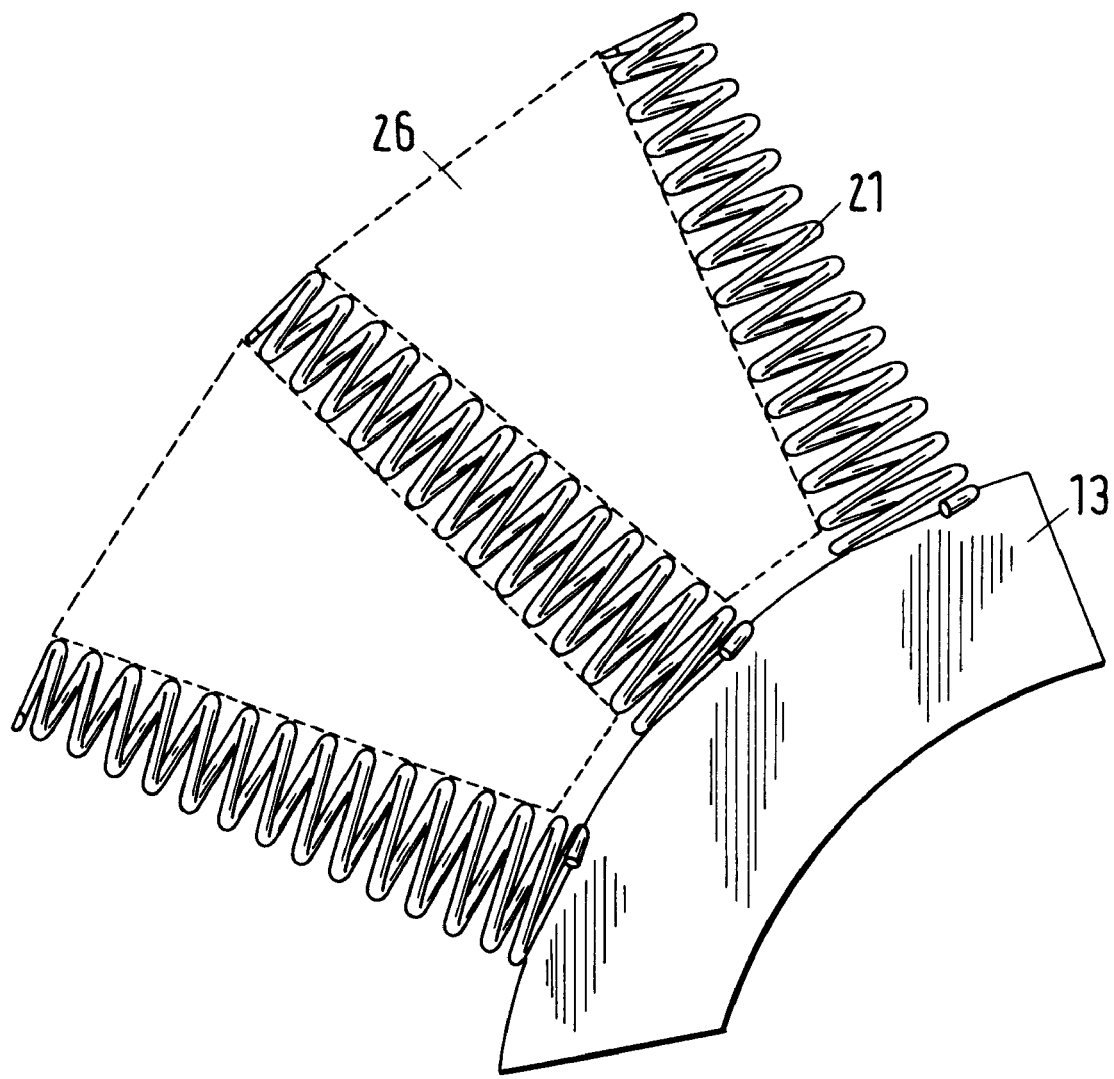
FIG. 27 shows in an illustration corresponding to FIG. 25 a further embodiment of a protective device according to the invention.

FIG. 27 shows a further embodiment in which the protective elements 14 are exclusively formed by coil-shaped pressure springs 21 that are attached immediately on the ring 13. The springs 21 are again of a conical shape wherein however in contrast to the embodiment according to FIG. 25 they have their greatest diameter at the ring 13 and at the free end they have their smallest diameter. The springs 21 are attached to the ring 13 at a somewhat larger spacing relative to one another so that the intermediate spaces between them are covered by the intermediate elements 26 that are embodied in accordance with one of the afore described embodiments.

In the described embodiments, the protective elements 14 as well as the intermediate elements 26 in a normal situation are spaced from the tire wall 13. The springs 21 and the intermediate elements 26 are elastically deformed only in a critical situation. In this way, a long service life of the protective device is ensured.

The protective device can be without problem adjusted to the respective ire 3 to be protected. As a result of the high flexibility of the protective elements 14 and the intermediate elements 26 different tire loads can be compensated that are the result of, for example, different tire pressure, different load state of the vehicle, temperature differences and the like. Also, the protective device can be adjusted without difficulty to the tire diameter and thus to the radial width of the tire wall 15.

Since the protective device has a central opening 20 the axial hub area of the wheel remains accessible for servicing. Accordingly, on such vehicles, even with the protective device mounted, the oil level control screws can be reached without problems.

In the described embodiments the annular coupling member 1 is clamped onto the inner wall of the wheel rim 2. It is of course possible to screw-connect the coupling member 1 to the inner wall of the wheel rim. For thus purpose, corresponding tabs or adapters for wheel screws, nuts and the like can be provided.

The springs 21 are uniformly wound in the described embodiments. Of course, the springs 21 across their length can also be wound to have different pitch, i.e., can be wound irregularly.

The springs 21 and the intermediate elements 26 can be exchanged without problem when damaged. This has the advantage the only individual parts of the protective device must be exchanged as needed.

The protective device has moreover comparatively minimal weight that in particular is advantageous during use. The minimal weight also results in correspondingly minimal centrifugal forces when traveling. Since wheels that are provided with such protective devices in general have a diameter of approximately 2 to approximately 4 m, the minimal weight is of particular advantage. Of course, the protective device can also be used in connection with conventional tire diameters as they are conventionally used in passenger cars or trucks.

The specification incorporates by reference the entire disclosure of German priority document 10 2008 046 568.2 having a filing date of Sep. 5, 2008.

While specific embodiments of the invention have been shown and described in detail to illustrate the inventive principles, it will be understood that the invention may be embodied otherwise without departing from such principles.

What is claimed is:

1. A protective device for tire walls of vehicle tires, comprising:
    at least one holder for attachment of the protective device on the wheel:
    protective elements that maintain a given shape when not under load and are elastically deformable under load and extend away from the holder substantially in a radial direction of the holder;
    wherein the protective elements each have a first end attached to a ring of the holder, wherein the ring is adjustable in an axial direction of the tire.

2. The protective device according to claim 1, wherein the protective elements extend across a radial width of the tire wall.

3. The protective device according to claim 1, wherein the protective elements have a spacing relative to the tire wall.

4. The protective device according to claim 1, wherein the ring is a flat annular disk.

5. The protective device according to claim 4, wherein the annular disk extends in a plane that extends approximately parallel relative to the tire wall.

6. The protective device according to claim 1, wherein the ring, viewed transversely to an axis of the tire, is positioned in an area adjacent to the tire wall.

7. The protective device according to claim 6, wherein the ring, viewed transversely to the axis of the tire, is positioned externally adjacent to the tire wall.

8. The protective device according to claim 6, wherein the ring, viewed transversely to the axis of the tire, is positioned within a tire opening or a wheel rim opening.

9. The protective device according to claim 1, wherein the ring, viewed transversely to the axis of the tire, is positioned in a plane of the tire wall.

10. The protective device according to claim 1, wherein the ring has insertion parts projecting transversely away from the ring, said insertion parts are insertable into receptacles.

11. The protective device according to claim 10, wherein the receptacles are sleeves.

12. The protective device according to claim 11, wherein the receptacles are disposed on a coupling member of the holder.

13. The protective device according to claim 10, wherein the receptacles extend parallel to an axis of the tire.

14. The protective device according to claim 12, wherein the coupling member is embodied as a ring.

15. A protective device for tire walls of vehicle tires, comprising:
    at least one holder for attachment of the protective device on the wheel:
    protective elements that maintain a given shape when not under load and are elastically deformable under load and extend away from the holder substantially in a radial direction of the holder;
    wherein the protective elements each have a first end attached to a ring of the holder;
    wherein the ring of the holder has insertion parts projecting transversely away from the ring of the holder, said insertion parts insertable into receptacles;
    wherein the receptacles are sleeves and are disposed on a coupling member of the holder;
    wherein the coupling member is embodied as a coupling member ring;
    wherein the diameter of the coupling member ring is adjustable.

16. The protective device according to claim 15, wherein the coupling member ring is comprised of at least two ring parts of part-circular shape that are releasably attached to one another.

17. The protective device according to claim 16, wherein the ring parts are connected to one another by at least one screw.

18. The protective device according to claim 17, wherein a spacing between the ring parts is adjustable by the at lest one screw.

19. The protective device according to claim 12, wherein the coupling member is a one-piece clamping ring having ends that are connected to one another by at least one clamping element with which at least one clamping element the clamping ring is clamped to an inner side of the wheel rim.

20. A protective device for tire walls of vehicle tires, comprising:
at least one holder for attachment of the protective device on the wheel:
protective elements that maintain a given shape when not under load and are elastically deformable under load and extend away from the holder substantially in a radial direction of the holder;
wherein the protective elements each have a first end attached to a ring of the holder;
wherein the ring has insertion parts projecting transversely away from the ring, said insertion parts insertable into receptacles;
wherein the receptacles are sleeves and are disposed on a coupling member of the holder;
wherein the coupling member is comprised of at least two clamping parts that are clamped against the inner side of the wheel rim.

21. The protective device according to claim 1, wherein the protective device is adapted to be attached to a wheel rim of a wheel.

22. The protective device according to claim 1, wherein the protective elements are at least partially in the form of a coil spring.

23. The protective device according to claim 22, wherein the coil spring is connected by at least one axle to a ring of the holder.

24. The protective device according to claim 23, wherein the at least one axle engages a first end of the coil spring.

25. The protective device according to claim 23, wherein the at least one axle projects radially outwardly across the ring of the holder.

26. A protective device for tire walls of vehicle tires, comprising:
at least one holder for attachment of the protective device on the wheel:
protective elements that maintain a given shape when not under load and are elastically deformable under load and extend away from the holder substantially in a radial direction of the holder;
wherein the protective elements are at least partially in the form of a coil spring;
wherein the coil spring is connected by at least one axle to a ring of the holder;
wherein the coil spring has a length consisting of a major portion and a minor portion and projects past the at least one axle with said major portion of said length.

27. The protective device according to claim 22, wherein the coil spring has a length and a constant diameter across the length.

28. The protective device according to claim 22, wherein the coil spring has a length and a varying diameter across the length.

29. The protective device according to claim 28, wherein the coil spring is conical.

30. The protective device according to claim 28, wherein the diameter of the coil spring increases outwardly in the radial direction.

31. The protective device according to claim 28, wherein the diameter of the coil spring increases inwardly in the radial direction.

32. The protective device according to claim 1, wherein the protective elements are arranged in uniform distribution about a circumference of the holder.

33. The protective device according to claim 1, further comprising at least one intermediate element arranged, respectively, between two of the protective elements that neighbor one another, respectively.

34. The protective device according to claim 33, wherein the at least one intermediate element is a chain net.

35. The protective device according to claim 34, wherein the chain net has inwardly in the radial direction a wider mesh than outwardly in the radial direction.

36. The protective device according to claim 34, wherein the chain net has same-size mesh openings.

37. The protective device according to claim 34, wherein the chain net has radially inwardly positioned chain lengths and is connected with the radially inwardly positioned chain lengths on the radial inner end of the protective elements.

38. The protective device according to claim 37, wherein the chain lengths of the chain nets that neighbor one another engage diametrically opposed areas of the protective elements.

39. The protective device according to claim 37, wherein the chain lengths of the neighboring chain nets engage areas of the protective elements that are displaced inwardly or outwardly relative to the radial direction.

40. The protective device according to claim 33, wherein the at least one intermediate element is a fabric.

41. The protective device according to claim 40, wherein the fabric is provided with mesh openings.

42. The protective device according to claim 1, wherein a spacing between protective elements that neighbor one another is smaller than a cross-sectional width of the protective elements.

* * * * *